US012686152B2

(12) United States Patent
Tsujikawa et al.

(10) Patent No.: US 12,686,152 B2
(45) Date of Patent: Jul. 21, 2026

(54) METHOD OF PRODUCING FIBER ASSEMBLY AND METHOD OF PRODUCING PREPREG SHEET

(71) Applicant: Mitsubishi Chemical Corporation, Tokyo (JP)

(72) Inventors: Kazuki Tsujikawa, Tokyo (JP); Takeshi Ishikawa, Tokyo (JP); Jun Matsui, Tokyo (JP); Masashi Ikeda, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 15 days.

(21) Appl. No.: 18/535,665

(22) Filed: Dec. 11, 2023

(65) Prior Publication Data

US 2024/0326293 A1 Oct. 3, 2024

Related U.S. Application Data

(63) Continuation of application No. PCT/JP2022/024337, filed on Jun. 17, 2022.

(30) Foreign Application Priority Data

| Jun. 18, 2021 | (JP) | 2021-101844 |
| Jun. 18, 2021 | (JP) | 2021-101845 |
| Jun. 18, 2021 | (JP) | 2021-101846 |
| Oct. 26, 2021 | (JP) | 2021-174789 |
| Nov. 22, 2021 | (JP) | 2021-189657 |

(51) Int. Cl.
| *B29B 9/14* | (2006.01) |
| *B29B 17/04* | (2006.01) |
| *B29K 105/12* | (2006.01) |
| *B29K 105/26* | (2006.01) |
| *B29K 307/04* | (2006.01) |

(52) U.S. Cl.
CPC ........ *B29B 9/14* (2013.01); *B29B 2017/0496* (2013.01); *B29K 2105/12* (2013.01); *B29K 2105/26* (2013.01); *B29K 2307/04* (2013.01); *B29K 2995/0063* (2013.01)

(58) Field of Classification Search
None
See application file for complete search history.

(56) References Cited

U.S. PATENT DOCUMENTS

| 5,639,807 A | * | 6/1997 | Secrist | D01F 11/14 428/394 |
| 2023/0139377 A1 | | 5/2023 | Harris et al. | |

FOREIGN PATENT DOCUMENTS

| EP | 0400526 A1 | 12/1990 |
| EP | 2902433 A1 | 8/2015 |

| EP | 4316766 A1 | 2/2024 |
| JP | S63-009511 A | 1/1988 |
| JP | H03-275139 A | 12/1991 |
| JP | H04-170435 A | 6/1992 |
| JP | H06-298993 A | 10/1994 |
| JP | H08-060001 A | 3/1996 |
| JP | H10-279777 A | 10/1998 |
| JP | 2000-220066 A | 8/2000 |
| JP | 3452363 B2 | 9/2003 |
| JP | 2006-265751 A | 10/2006 |
| JP | 2006-290062 A | 10/2006 |
| JP | 2014 167 078 A | * | 9/2014 |
| JP | 2014-221848 A | 11/2014 |
| JP | 2018-199230 A | 12/2018 |
| JP | 2019-035045 A | 3/2019 |
| JP | 2020 047 601 A | * | 3/2020 |
| JP | 2020-196882 A | 12/2020 |
| WO | 2022/210591 A1 | 10/2022 |

OTHER PUBLICATIONS

Office Action issued in corresponding Japanese Patent Application No. 2023-530434, dated Dec. 3, 2024.
International Search Report issued in corresponding International Patent Application No. PCT/JP2022/024337 dated Aug. 2, 2022.
Extended European Search Report issued in corresponding European Patent Application No. 22825088.2, dated Sep. 16, 2024.
Office Action issued in corresponding Japanese Patent Application No. 2023-530434, dated Apr. 22, 2025.
Office Action issued in corresponding Chinese Patent Application No. 202280041902.2, dated Aug. 6, 2025.
Search Report issued in corresponding Chinese Patent Application No. 202280041902.2, dated Aug. 6, 2025.
Extended European Search Report issued in corresponding European Patent Application No. 25202452.6, dated Jan. 22, 2026.
Shibata, "CFRP Recycling Technology using Depolymerization of Epoxy Resin under Ordinary Pressure", Journal of the Society for Recycling of Wastes and Resources, Nippon, vol. 24, No. 5, 2013, pp. 358-363, with an English Abstract.
Office Action issued in corresponding Japanese Patent Application No. 2025-007848, dated Mar. 31, 2026.

(Continued)

*Primary Examiner* — Mohammad M Ameen

(74) *Attorney, Agent, or Firm* — Morgan, Lewis & Bockius LLP

(57) ABSTRACT

A method for producing a fiber assembly, including: putting a plurality of fibers and a fiber treatment agent into a stirring tank; and stirring a mixture of the fibers and the fiber treatment agent with a stirring blade to granulate the mixture, wherein the fibers include carbon fibers, and the mixture is granulated such that the fibers are aligned. A method for producing a fiber assembly, wherein a plurality of fibers containing carbon fibers and a liquid are put into a stirring tank and the mixture of the fibers and the liquid is stirred with a stirring blade, thereby obtaining a fiber assembly which has a spheroidal shape or a strand shape.

14 Claims, 12 Drawing Sheets

(56)    References Cited

OTHER PUBLICATIONS

Office Action issued in corresponding Japanese Patent Application
No. 2025-082705, dated Mar. 31, 2026.

* cited by examiner

[FIG. 1]

[FIG. 2]
Fig. 2a
Fig. 2b
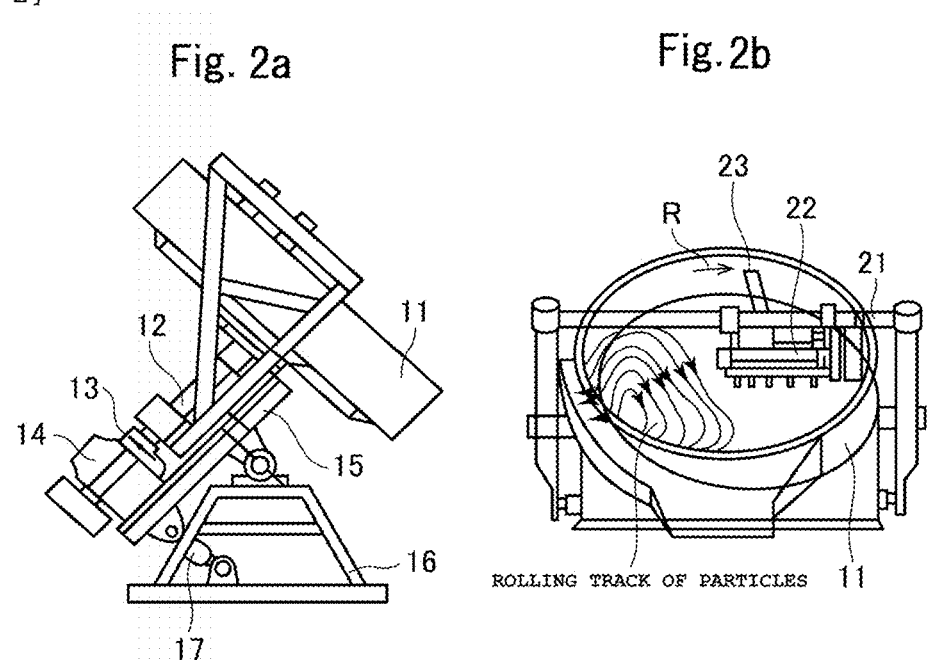
ROLLING TRACK OF PARTICLES
[FIG. 3A]
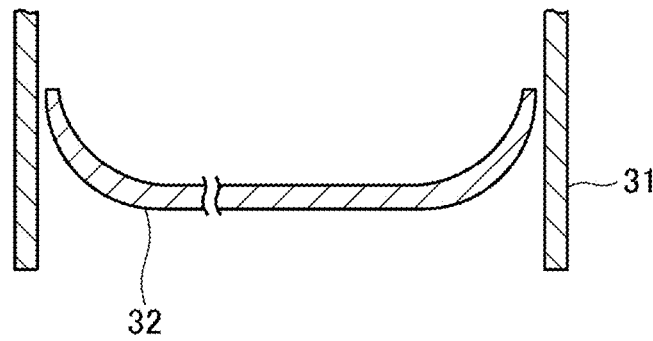

[FIG. 3B]
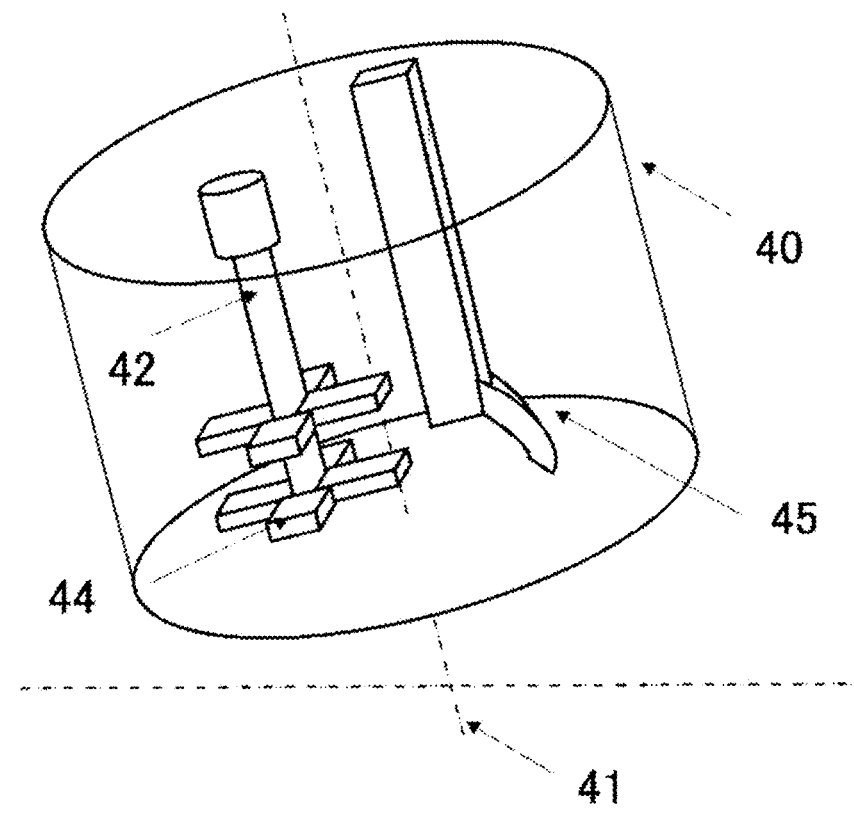

[FIG. 4]

[FIG. 5]
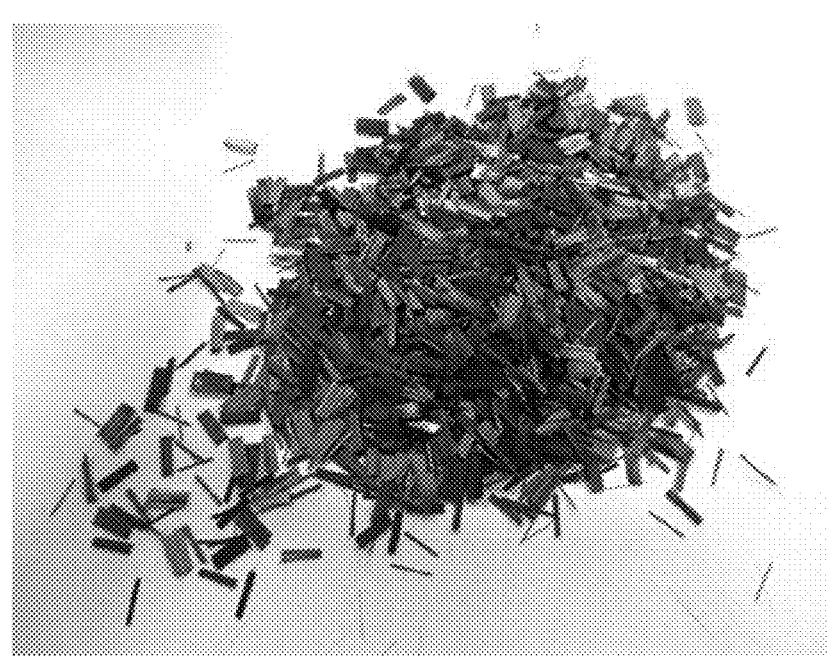

[FIG. 6]
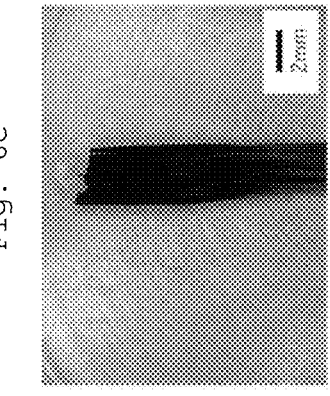
Fig. 6d
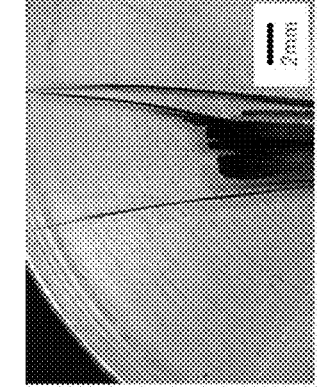
Fig. 6c
Fig. 6b
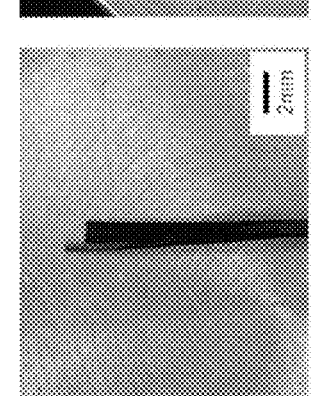
Fig. 6a

[FIG. 7]
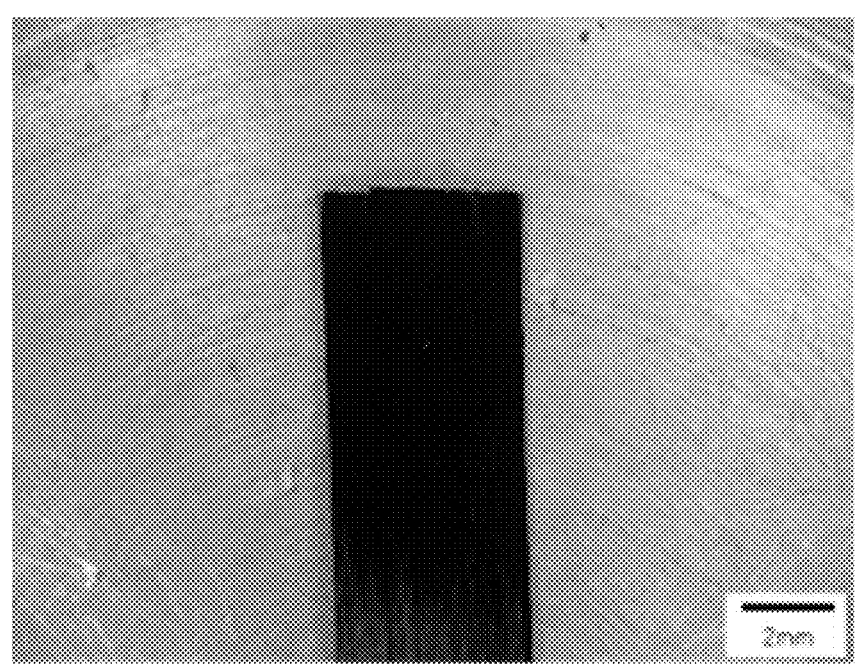

[FIG. 9]
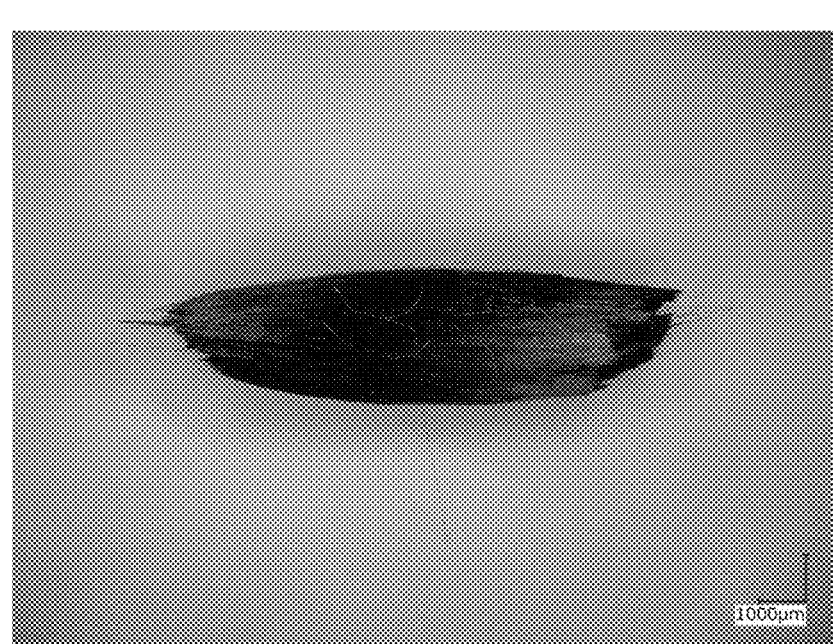

[FIG. 10]
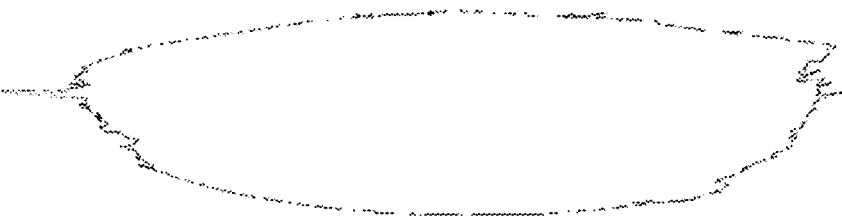
[FIG. 11]
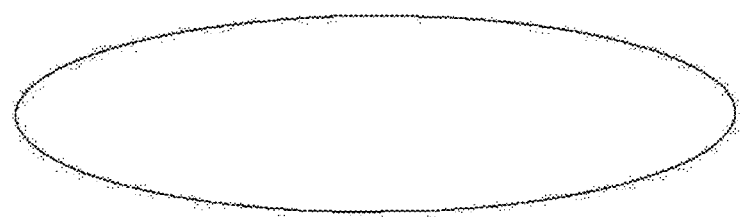

[FIG. 12]

[FIG. 13]
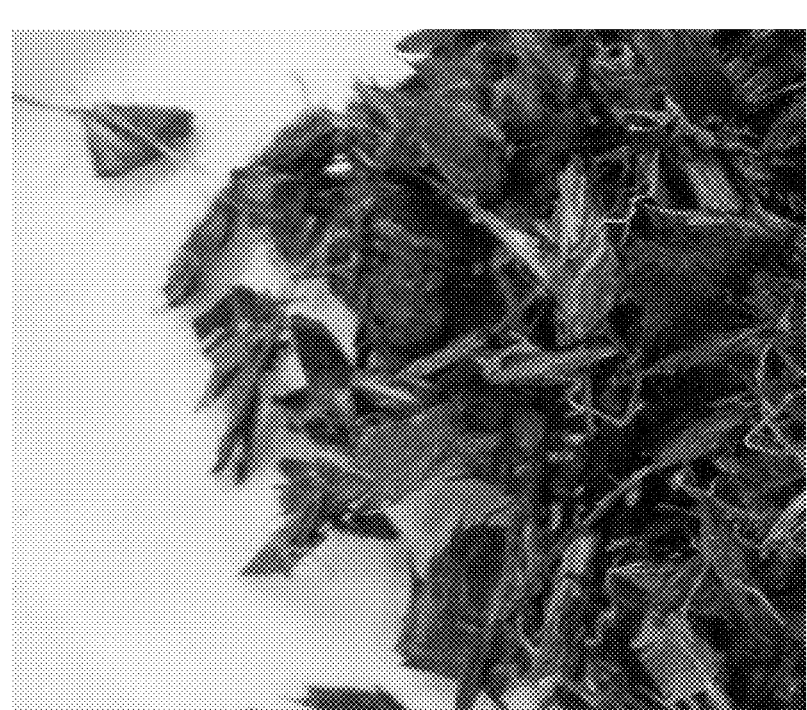

METHOD OF PRODUCING FIBER ASSEMBLY AND METHOD OF PRODUCING PREPREG SHEET

TECHNICAL FIELD

The present invention relates to a method for producing a fiber assembly and a method for producing a prepreg sheet.

BACKGROUND ART

Carbon fibers have been used for various applications as an industrially important material for improving mechanical and electrical properties, such as high strength, high rigidity, a low specific gravity, high electrical conductivity, and high abrasion resistance, by being mixed and dispersed in a matrix such as a resin.

In general, when carbon fibers are mixed and dispersed in various resins to obtain a fiber reinforced resin composition, a carbon fiber assembly formed by granulating a plurality of carbon fibers in advance with a sizing agent or the like has been used in order to facilitate handling of the carbon fibers so that the workability in the step of mixing and dispersing the carbon fibers is increased.

The carbon fiber assembly is required to have excellent workability in a case of producing a fiber reinforced resin composition, supply stability of a feeder, excellent fiber dispersibility in a matrix, and an excellent effect of improving physical properties of a resin composition to be obtained.

As a carbon fiber assembly having such required properties, a carbon fiber assembly that has a predetermined average particle diameter and is surface-coated with an emulsion-based sizing agent containing an epoxy compound as a main component, and carbon fiber chopped strands that are bundled with a predetermined sizing agent, have a predetermined compactness, and have a cross section in a circular shape or an elliptical shape are disclosed (for example, PTL 1).

Further, as a carbon fiber assembly in which carbon fibers can be quantitatively and stably supplied from recycled carbon fibers to an extruder or the like using a feeder and the carbon fibers can be easily and uniformly dispersed in a resin matrix using an extruder or the like, a carbon fiber assembly that is formed of carbon fibers and an epoxy resin-based sizing agent, is produced by a wet extrusion granulation method, and has a predetermined bulk density or the like is disclosed (for example, PTL 2).

Further, as a method of efficiently producing an entangled form formed of short carbon fibers, a method for producing a carbon fiber entangled form using a stirring granulation method of stirring curved carbon fibers together with a flexible sphere is disclosed (for example, PTL 3).

CITATION LIST

Patent Literature

PTL 1: JP-H4-170435A
PTL 2: JP2020-196882A
PTL 3: JP2000-220066A

SUMMARY OF INVENTION

Technical Problem

An object of the present invention is to provide a method for producing a fiber assembly that enables production of a fiber assembly with a high bulk density, in which fibers are aligned while maintaining the length without being cut.

Another object of the present invention is to provide a method for producing a prepreg sheet obtained by using the fiber assembly.

Solution to Problem

The present invention found that the above-described objects can be achieved by stirring and granulating fibers and a fiber treatment agent using a stirring tank.

That is, the present invention includes the following aspects [1] to [45]. The following aspects [1] to [45] may be referred to as "first aspect of the present invention".

[1] A method for producing a fiber assembly, comprising:
putting a plurality of fibers and a fiber treatment agent into a stirring tank; and
stirring a mixture of the fibers and the fiber treatment agent with a stirring blade to granulate the mixture,
wherein the fibers include carbon fibers, and
the mixture is granulated such that the fibers are aligned.

[2] The method for producing a fiber assembly according to [1],
wherein the plurality of fibers in a fluffy form which have been dried are put into the stirring tank.

[3] The method for producing a fiber assembly according to [1] or [2],
wherein a stirring blade rotating in a horizontal direction and an auxiliary stirring blade rotating in a vertical direction are disposed in the stirring tank, and
the stirring is carried out by the stirring blade rotating in the horizontal direction and the auxiliary stirring blade rotating in the vertical direction.

[4] The method for producing a fiber assembly according to any one of [1] to [3],
wherein the plurality of fibers are loosened in the stirring tank by being stirred with the stirring blade before the fiber treatment agent is put into the stirring tank.

[5] The method for producing a fiber assembly according to any one of [1] to [4],
wherein the stirring tank includes a scraper and is made to rotate.

[6] The method for producing a fiber assembly according to any one of [1] to [5],
wherein the stirring blade is inclined in a rotation direction, and
a nipped angle between a rear surface of the stirring blade in the rotation direction and a bottom surface of the stirring tank is in a range of 1° to 60°.

[7] The method for producing a fiber assembly according to any one of [1] to [6],
wherein the stirring tank includes a rotating shaft that is rotatable around an axis, and
a plurality of the stirring blades radially extend from the rotating shaft.

[8] The method for producing a fiber assembly according to any one of [1] to [7],
wherein the stirring blade in made to rotate such that a tip of the stirring blade rotates at a peripheral speed of 1 to 20 m/sec.

[9] The method for producing a fiber assembly according to any one of [5] to [8],
wherein the stirring is carried out such that a rotation direction of the stirring blade is opposite to a rotation direction of the stirring tank, and then the stirring is carried out such that the rotation direction of the stirring blade is the same as the rotation direction of the stirring tank.

[10] The method for producing a fiber assembly according to [5] or [9], wherein the stirring tank is made to rotate at a peripheral speed of 1.2 m/sec or less.

[11] The method for producing a fiber assembly according to any one of [1] to [10], wherein the fiber treatment agent has a surface tension of 120 mN/m or less at 23° C.

[12] The method for producing a fiber assembly according to any one of [1] to [11], wherein the fiber treatment agent has a viscosity of 10 Pa·s or less at 23° C.

[13] The method for producing a fiber assembly according to any one of [1] to [12], wherein the fiber treatment agent contains water.

[14] The method for producing a fiber assembly according to any one of [1] to [13], wherein the fiber treatment agent contains one or more resins selected from an epoxy resin, an unsaturated polyester resin, a vinyl ester resin, a polyurethane resin, and a polyamide resin.

[15] The method for producing a fiber assembly according to any one of [1] to [14], wherein a content of the fiber treatment agent to be added to the fibers is in a range of 10 to 40 parts by mass with respect to 100 parts by mass of the fibers.

[16] The method for producing a fiber assembly according to any one of [1] to [15], wherein the fiber treatment agent contains a liquid, and the method further includes a step of evaporating the liquid contained in the fiber treatment agent.

[17] The method for producing a fiber assembly according to any one of [1] to [16], wherein the fibers further include glass fibers.

[18] The method for producing a fiber assembly according to any one of [1] to [17], wherein the fibers further include organic fibers.

[19] The method for producing a fiber assembly according to any one of [1] to [18], wherein the fibers have an average fiber length of 12 to 50 mm.

[20] The method for producing a fiber assembly according to any one of [1] to [19], wherein the fibers have an average fiber length of 2 to 12 mm.

[21] The method for producing a fiber assembly according to any one of [1] to [20], wherein positions of tips of the plurality of fibers constituting the fiber assembly are not aligned.

[22] The method for producing a fiber assembly according to any one of [1] to [21], wherein a length of a major axis of the fiber assembly is greater than an average fiber length of the fibers contained in the fiber assembly.

[23] The method for producing a fiber assembly according to any one of [1] to [22], wherein the fiber assembly has a prolate spheroidal shape or a strand shape.

[24] The method for producing a fiber assembly according to any one of [1] to [23], wherein a ratio (Y/X) of an average fiber length Y of the fibers in the fiber assembly to an average fiber length X of the fibers before being put into the stirring tank is 0.55 or more.

[25] The method for producing a fiber assembly according to any one of [1] to [24], wherein the fiber assembly is granulated by stirring using a Henschel mixer.

[26] The method for producing a fiber assembly according to any one of [1] to [24], wherein the fiber assembly is granulated by stirring using a granulator.

[27] The method for producing a fiber assembly according to any one of [1] to [26], wherein the fiber treatment agent has a surface tension of 15 mN/m or more at 23° C.

[28] The method for producing a fiber assembly according to any one of [1] to [27], wherein the fiber treatment agent has a viscosity of 0.0001 Pa·s or more at 23° C.

[29] The method for producing a fiber assembly according to any one of [1] to [28], wherein the number of filaments in the fiber assembly is 8000 or more and 800000 or less.

[30] The method for producing a fiber assembly according to any one of [1] to [29], wherein the fibers have a bulk density of 0.01 to 0.040 g/cm$^3$.

[31] The method for producing a fiber assembly according to any one of [1] to [30], wherein the strain rate applied to the fibers and the fiber treatment agent is 1 [l/s] or more and 700 [l/s] or less.

A method for producing a fiber assembly, wherein a plurality of fibers and a fiber treatment agent containing a liquid are put a stirring tank, and a mixture of the fibers and the fiber treatment agent is stirred with a stirring blade to cause liquid cross-linking, thereby producing directly a fiber assembly in which the fibers are aligned.

[33] The method for producing a fiber assembly according to [32], wherein the fibers contain carbon fibers.

[34] The method for producing a fiber assembly according to [32] or [33], wherein the plurality of dry and fluffy fibers are put into the stirring tank.

[35] A method for producing a fiber assembly in which carbon fibers are aligned, wherein a plurality of fluffy carbon fibers, a resin, and water are put into a stirring tank, and the plurality of carbon fibers, the resin, and the water are stirred and granulated with a stirring blade arranged in the stirring tank.

[36] The method for producing a fiber assembly in which carbon fibers are aligned according to [35], wherein a raw material containing the plurality of fluffy carbon fibers and a resin carbide are added.

[37] The method for producing a fiber assembly in which carbon fibers are aligned according to [35] or [36], wherein a raw material containing the plurality of fluffy carbon fibers and glass fibers is added.

[38] A method for producing a prepreg sheet, comprising depositing a plurality of fiber assemblies produced by the method for producing a fiber assembly according to any one of [1] to [37].

[39] A method for producing pellets, comprising kneading a fiber assembly produced by the method for producing a fiber assembly according to any one of [1] to [37] together with a resin.

[40] A carbon fiber assembly consisting of a plurality of carbon fibers and an organic binder, having a bulk density of 0.1 to 0.29 g/cm$^3$ or having an angle of repose of 60° or less, and having a prolate spherical shape with a major axis length of 3 mm to 18 mm.

[41] The carbon fiber assembly according to [40], wherein the positions of the tips of the plurality of fibers constituting the carbon fiber assembly are not aligned.

[42] The carbon fiber assembly according to [40] or [41], wherein the length of the major axis of the carbon fiber assembly is longer than the average fiber length of the fibers contained in the carbon fiber assembly.

[43] The carbon fiber assembly according to any one of [40] to [42], wherein the carbon fiber assembly contains resin carbide.

[44] The carbon fiber assembly according to any one of [40] to [43], wherein the carbon fiber assembly contains glass fibers.

[45] The carbon fiber assembly according to any one of [40] to [44], wherein the organic binder contains one or more resins selected from an epoxy resin, an unsaturated polyester resin, a vinyl ester resin, a polyurethane resin, and a polyamide resin.

The present invention also includes the following aspects [1a] to [25a]. The following aspects [1a] to [25a] below may be referred to as "I of the first aspect of the present invention".

[1a] A method for producing a fiber assembly, wherein fibers and a fiber treatment agent are put into a stirring tank, and a mixture of the fibers and the fiber treatment agent is stirred with a stirring blade to granulate the mixture.

[2a] The method for producing a fiber assembly according to [1a], wherein the stirring blades are inclined in the direction of rotation, and the angle between the rear surface of the stirring blades in the direction of rotation and the bottom surface of the stirring tank is 1 to 60°.

[3a] The method for producing a fiber assembly according to [1a] or [2a], wherein the plurality of stirring blades radially extend from the rotating shaft in the stirring tank.

[4a] The method for producing a fiber assembly according to any one of [1a] to [3a], wherein the peripheral speed of the tip of the stirring blade is 1 to 20 m/sec.

[5a] A method for producing a fiber assembly, wherein the fibers and the fiber treatment agent are granulated by stirring them using a Henschel mixer.

[6a] A method for producing a fiber assembly, wherein the fibers and the fiber treatment agent are agitated using a granulator to granulate.

[7a] The method for producing a fiber assembly according to any one of [1a] to [6a], wherein the fiber treatment agent has a surface tension of 120 mN/m or less at 23° C.

[8a] The method for producing a fiber assembly according to any one of [1a] to [7a], wherein the fiber treatment agent has a viscosity of 10 Pa·s or less at 23° C.

[9a] The method for producing a fiber assembly according to any one of [1a] to [8a], wherein the fibers have an average fiber length of 1 to 100 mm.

[10a] The method for producing a fiber assembly according to any one of [1a] to [9a], wherein 5 to 120 parts by mass of the fiber treatment agent is added to 100 parts by mass of the fibers.

[11a] The method for producing a fiber assembly according to any one of [1a] to [10a], wherein the fibers contain carbon fibers.

[12a] The method for producing a fiber assembly according to any one of [1a] to [10a], wherein the fibers contain glass fibers.

[13a] The method for producing a fiber assembly according to any one of [1a] to [10a], wherein the fibers contain organic fibers.

[14a] The method for producing a fiber assembly according to any one of [1a] to [10a], wherein the fibers contain carbon fibers and organic fibers.

[15a] The method for producing a fiber assembly according to any one of [1a] to [10a], wherein the fibers contain carbon fibers and glass fibers.

[16a] The method for producing a fiber assembly according to any one of [1a] to [15a], wherein the fiber treatment agent contains at least one selected from solvents, clay minerals, polymers, and surfactants.

[17a] The method for producing a fiber assembly according to any one of [1a] to [16a], wherein a ratio (Y/X) of an average fiber length Y of the fibers in the fiber assembly to an average fiber length X of the fibers before being put into the stirring tank is 0.55 or more.

[18a] The method for producing a fiber assembly according to any one of [1a] to [17a], wherein the fiber treatment agent contains liquid, and the method includes a step of evaporating the liquid contained in the fiber treatment agent.

[19a] The method for producing a fiber assembly according to any one of [1a] to [18a], wherein the fiber assembly has a spheroidal shape or a strand shape.

[20a] The method for producing a fiber assembly according to any one of [1a] to [19a], wherein the fibers are granulated so that they are aligned.

[21a] A method for producing a fiber assembly, which includes putting fibers and a liquid fiber treatment agent into a stirring tank, and stirring the mixture of the fibers and the fiber treatment agent with a stirring blade to granulate the mixture.

[22a] The method for producing a fiber assembly according to [21a], wherein the fibers have an average fiber length of 1 to 100 mm.

[23a] The method for producing a fiber assembly according to [21a] or [22a], wherein 5 to 120 parts by mass of the fiber treatment agent is added to 100 parts by mass of the fibers.

[24a] The method for producing a fiber assembly according to any one of [21a] to [23a], wherein the fiber assembly has a spheroidal shape or a strand shape.

[25a] The method for producing a fiber assembly according to any one of [21a] to [24a], wherein a ratio (Y/X) of an average fiber length Y of the fibers in the fiber assembly to an average fiber length X of the fibers before being put into the stirring tank is 0.55 or more.

The present invention also includes the following aspects [1b] to [20b]. The following aspects [1b] to [20b] may be referred to as the "second aspect of the present invention".

[1b] A method for producing a fiber assembly, including putting fibers and a fiber treatment agent into a rolling tank and rotating the rolling tank to granulate.

[2b] The method for producing a fiber assembly according to [1b], wherein the fiber treatment agent has a surface tension of 120 mN/m or less at 23° C.

[3b] The method for producing a fiber assembly according to [1b] or [2b], wherein the fiber treatment agent has a viscosity of 10 Pa·s or less at 23° C.

[4b] The method for producing a fiber assembly according to any one of [1b] to [3b], wherein the rolling tank has a pan-shaped rotating body.

[5b] The method for producing a fiber assembly according to any one of [1b] to [3b], wherein the rolling tank has a drum-shaped rotating body.

[6b] The method for producing a fiber assembly according to [4b] or [5b], wherein the moving speed of a cylindrical side wall of the rolling tank is 0.20 to 1.60 m/s.

[7b] The method for producing a fiber assembly according to any one of [1b] to [3b], wherein the rolling tank has a fixed side wall and a rotating container that horizontally rotates inside the side wall.

[8b] The method for producing a fiber assembly according to [7b], wherein the rotating container rotates at an outer peripheral speed of 1 to 20 m/s.

[9b] The method for producing a fiber assembly according to any one of [1b] to [8b], wherein the fibers have an average fiber length of 1 to 100 mm.

[10b] The method for producing a fiber assembly according to any one of [1b] to [9b], wherein 5 to 120 parts by mass of the fiber treatment agent is used with respect to 100 parts by mass of the fibers.

[11b] The method for producing a fiber assembly according to any one of [1b] to [10b], wherein the fibers contain carbon fibers.

[12b] The method for producing a fiber assembly according to any one of [1b] to [10b], wherein the fibers contain glass fibers.

[13b] The method for producing a fiber assembly according to any one of [1b] to [10b], wherein the fibers contain organic fibers.

[14b] The method for producing a fiber assembly according to any one of [1b] to [10b], wherein the fibers contain carbon fibers and organic fibers.

[15b] The method for producing a fiber assembly according to any one of [1b] to [10b], wherein the fibers contain carbon fibers and glass fibers.

[16b] The method for producing a fiber assembly according to any one of [1b] to [15b], wherein the fiber treatment agent contains at least one selected from solvents, clay minerals, polymers, and surfactants.

[17b] The method for producing a fiber assembly according to any one of [1b] to [16b], wherein the ratio (Y/X) of an average fiber length Y of the fibers in the fiber assembly to an average fiber length X of the fibers before being put into the stirring tank is 0.55 or more.

[18b] The method for producing a fiber assembly according to any one of [1b] to [17b], wherein the fiber treatment agent contains liquid, and includes a step of evaporating the liquid contained in the fiber treatment agent.

[19b] The method for producing a fiber assembly according to any one of [1b] to [18b], wherein the fiber assembly has a spheroidal shape or a strand shape.

[20b] The method for producing a fiber assembly according to any one of [1b] to [19b], wherein the fibers are granulated so that they are aligned.

The present invention also includes the following aspects [1c] to [16c]. The following aspects [1c] to [16c] may be referred to as the "third aspect of the present invention".

[1c] A method for producing a fiber assembly, which includes granulating fibers by liquid-crosslinking to grow particles of the fibers while applying a strain rate to the fibers and a fiber treatment agent.

[2c] The method for producing a fiber assembly according to [11c], wherein the strain rate is 1 [l/s] or more and 700 [l/s] or less.

[3c] The method for producing a fiber assembly according to [1c] or [2c], wherein the operation of applying a strain rate is an operation of imparting a shear rate by moving a stirring blade to bring the fibers and the fiber treatment agent into contact with each other.

[4c] The method for producing a fiber assembly according to [1c] or [2c], wherein the operation of applying the strain rate is an operation of applying the vibration rate by vibrating a container containing the fibers and the fiber treatment agent.

[5c] The method for producing a fiber assembly according to [1c] or [2c], wherein the operation of applying the strain rate is an operation of rotating a container containing the fibers and the fiber treatment agent to apply the rotational speed.

[6c] The method for producing a fiber assembly according to [1c] or [2c], wherein the operation of applying the strain rate is an operation of applying an airflow shear rate by blowing gas into a container containing the fibers and the fiber treatment agent.

[7c] The method for producing a fiber assembly according to any one of [1c] to [6c], wherein 5 to 120 parts by mass of the fiber treatment agent is used with respect to 100 parts by mass of the total amount of the fibers.

[8c] The method for producing a fiber assembly according to any one of [1c] to [7c], wherein the fibers have an average fiber length of 1 to 100 mm.

[9c] The method for producing a fiber assembly according to any one of [1c] to [8c],
  wherein the fiber treatment agent contains at least one selected from solvents, clay minerals, polymers, and surfactants.

[10c] The method for producing a fiber assembly according to any one of [1c] to [9c],
  wherein the fibers include at least one type of fiber selected from the group consisting of carbon fiber, glass fiber, and organic fiber.

[11c] The method for producing a fiber assembly according to any one of [1c] to [10c],
  wherein the fiber assembly has a spheroidal shape or a strand shape.

[12c] The method for producing a fiber assembly according to any one of [1c] to [11c],
  wherein the fibers are granulated so that they are aligned.

[13c] A method for producing a fiber assembly, which includes granulating fibers by growing particles of the fibers by liquid-crosslinking the fibers while performing an operation to give a shear rate by moving a stirring blade to bring the fibers and a fiber treatment agent into contact with each other.

[14c] A method for producing a fiber assembly, comprising granulating fibers by growing particles of the fibers by liquid-crosslinking the fibers while performing an operation to give a vibration speed by vibrating a container containing fibers and a fiber treatment agent.

[15c] A method for producing a fiber assembly, comprising granulating fibers by growing particles of the fibers by liquid-crosslinking the fibers while performing an operation to give a rotation speed by rotating a container containing the fibers and a fiber treatment agent.

[16c] A method for producing a fiber assembly, which includes granulating fibers by growing particles of the fibers by liquid-crosslinking the fibers while performing an operation to give an air flow shear rate by blowing gas into a container containing the fibers and a fiber treatment agent.

The present invention also includes the following aspects [1d] to [17d]. The following aspects [1d] to [17d] may be referred to as the "fourth aspect of the present invention".

[1d] A fiber bundle containing a plurality of carbon fibers and a resin or solvent, wherein the fiber bundle has an ellipsoidal shape, has an A'/A ratio specified by the following condition (1) in a range of 0.75 to 0.93.
  Condition (1): The fiber bundles are put on one side of a white plate, and obtain an image by capturing an image in the vertical direction to the plate. The image is binarized using image analysis software to obtain a binary image. The contour of the binary image is extracted to obtain the contour of the fiber bundles. The Feret's diameter is acquired from the obtained contour and the thus acquired length of the major axis is defined as A. A length of a major axis of an ellipse obtained by performing ellipse approximation to the binary image is defined as A'.

[2d] The fiber bundle according to [1d],
  wherein the major axis length A of the fiber bundle is 3 to 30 mm.

[3d] The fiber bundle according to [1d] or [2d],
  wherein the average fiber length of the fibers in the fiber bundle is shorter than the long axis.

[4d] The fiber bundle according to any one of [1d] to [3d],
  wherein the fibers in the fiber bundle have an average fiber length of 2 to 12 mm.

[5d] The fiber bundle according to any one of [1d] to [4d],
  wherein the fibers present on the surface of the fiber bundle are curved and oriented along an outline of the ellipsoid.

[6d] The fiber bundle according to any one of [11d] to [5d],
  wherein the fiber bundle has the long axis, a short axis 1 and a short axis 2, and the length B of the short axis 1 is longer than the length C of the short axis 2.

[7d] The fiber bundle according to any one of [11d] to [6d],
  wherein B is 1 to 9 mm and C is 0.5 to 6 mm.

[8d] The fiber bundle according to any one of [1d] to [7d],
  wherein the fiber bundle has a long axis to short axis 1 ratio (B/A) of 2 to 12 and a long axis to short axis 2 ratio (C/A) of 1 to 6.

[9d] The fiber bundle according to any one of [1d] to [8d],
  wherein B is 1.5 times or more of C.

[10d] The fiber bundle according to any one of [1d] to [9d],
  wherein the fiber bundle has a particle density represented by the following formula (2) of 0.3 to 1.8 $g/cm^3$.

$$\text{Particle density} = G/(4\pi abc/3) \qquad \text{Formula (2)}$$

(In formula (2), G represents the mass of the fiber bundle, a represents A/2, b represents B/2, and c represents C/2.)

[11d] The fiber bundle according to any one of [1d] to [10d],
  wherein the fiber bundle contains resin carbide.

[12d] The fiber bundle according to any one of [1d] to [11d],
  wherein the fiber bundle contains glass fibers.

[13d] The fiber bundle according to any one of [1d] to [12d],
  wherein the fibers contain a resin.

[14d] The fiber bundle according to [13d],
  wherein the resin contains at least one selected from an epoxy resin, an urethane resin, and a polyamide resin.

[15d] A fiber assembly which is formed of fiber bundles containing a plurality of fibers and a resin or a solvent, in which a proportion of the number of fiber bundles W having an elliptical shape, in which a ratio A/A' specified by Condition (1) is in a range of 0.75 to 0.93, in the number of the fiber bundles is 50% or more.
  Condition (1): The fiber bundles are put on one side of a white plate, and obtain an image by capturing an image in the vertical direction to the plate. The image is binarized using image analysis software to obtain a binary image. The contour of the binary image is extracted to obtain the contour of the fiber bundles. The Feret's diameter is acquired from the obtained contour and the thus acquired length of the major axis is defined as A. A length of a major axis of an ellipse obtained by performing ellipse approximation to the binary image is defined as A'.

[16d] The fiber assembly according to [15d],
  wherein the fiber assembly has a bulk density of 0.1 to 0.8 $g/cm^3$.

[17d] The fiber assembly according to [15d] or [16d],
wherein the fiber assembly has a repose angle of 60° or
less.

Advantageous Effects of Invention

According to the preferred embodiments of the present
invention, it is possible to obtain a fiber assembly with a high
bulk density, in which fibers are aligned while maintaining
the length without being cut. In addition, even recycled
fibers with a low bulk density can be made in the form of a
highly densely aligned fiber assembly. Therefore, in facili-
ties where various feeders such as fiber reinforced resin
pellets are used, fibers can be efficiently supplied without
causing bridges between fibers.

A fiber reinforced resin composition exhibiting an effect
of improving the original physical properties of carbon
fibers and a prepreg sheet can be produced by quantitatively
and stably supplying fibers with a feeder based on the
improved handling workability using the fiber assembly
produced by the present invention, for example, the carbon
fiber assembly.

BRIEF DESCRIPTION OF DRAWINGS

FIG. 1 is a view showing an embodiment of stirring
blades of a stirring tank used in a method for producing a
fiber assembly according to a first aspect of the present
invention.
FIG. 1b is a
cross-sectional view taken along line b-b of FIG. 1a.

FIG. 2 is a schematic view showing an embodiment of a
pan granulator used in a method for producing a fiber
assembly according to a second aspect of the present inven-
tion. FIG. 2a is a side view, and FIG. 2b is a view showing
an internal structure of a granulation pan.

FIG. 3A is a cross-sectional view showing fixed side walls
of a rolling tank and a rotating container used in the method
for producing a fiber assembly according to the second
aspect of the present invention.

FIG. 3B is an internal perspective view showing an
embodiment of a rolling and stirring granulator used in the
method for producing a fiber assembly according to the first
aspect of the present invention.

FIG. 4 is a photograph showing an example of the form
of recycled fibers.

FIG. 5 is a photograph showing an example of the form
of virgin fibers.

FIGS. 6a to 6d are each an enlarged photograph showing
terminals of SACFB.

FIG. 7 is an enlarged photograph showing a terminal of a
chopped carbon fiber bundle.

FIG. 9 is a captured image of a fiber bundle obtained in
Example 1.

FIG. 10 is a view showing the contour of the fiber bundle
obtained in Example 1.

FIG. 11 is a view showing an approximation ellipse to the
fiber bundle obtained in Example 1.

FIG. 12 is a captured image of a fiber bundle obtained in
Experimental Example 3.

FIG. 13 is a captured image of a fiber bundle obtained in
Experimental Example 4.

DESCRIPTION OF EMBODIMENTS

Figure 1A:
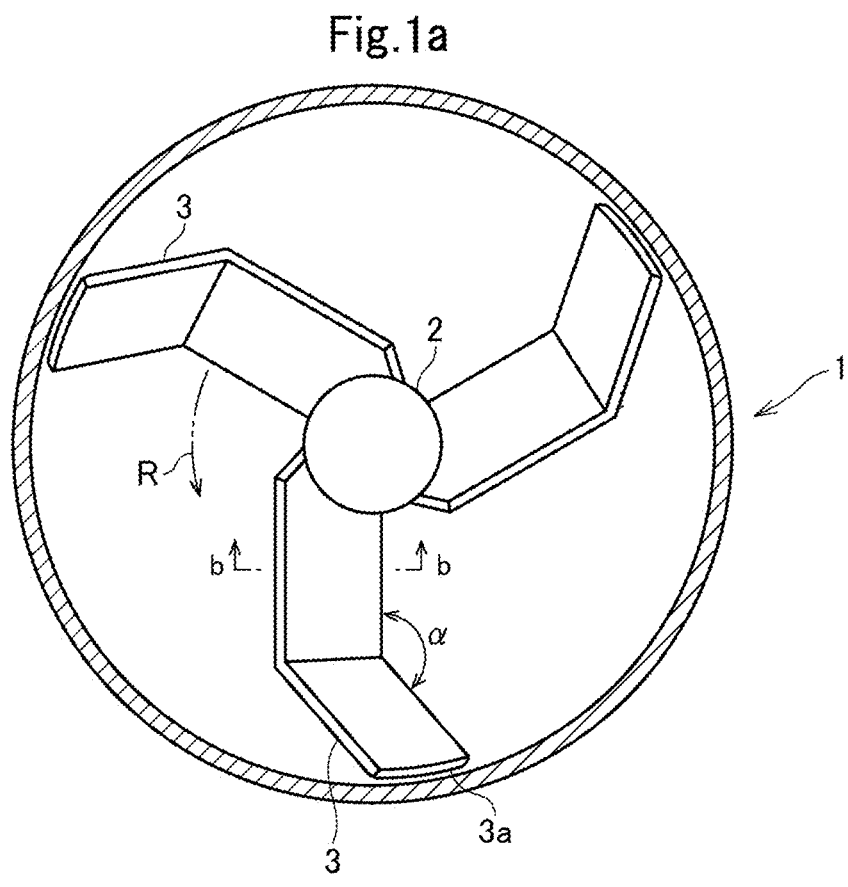
FIG. 1a is a cross-sectional view showing the
stirring tank in a horizontal direction.

Hereinafter, embodiments of the present invention will be
described in detail.

First to Third Aspects of Present Invention

A method for producing a fiber assembly according to a
first aspect of the present invention is a method for produc-
ing a fiber assembly by putting a plurality of fibers and a
fiber treatment agent into a stirring tank using at least carbon
fibers as the fibers and stirring a mixture of the fibers and the
fiber treatment agent with a stirring blade to granulate the
mixture such that the fibers are aligned. According to the
present aspect, a fiber assembly with aligned fibers can be
obtained even when raw material fibers having a long fiber
length are used. A self-assembled carbon fiber bundle may
be exemplified as an example of the carbon assembly. A
plurality of fibers can be assembly d by granulation to form
one granular unit.

In the first aspect of the present invention, a Henschel
mixer or a granulator can be used as a stirring granulator.

The method for producing a fiber assembly according to
I of the first aspect of the present invention includes the
following steps 1 to 4.

1. A step of wetting fibers with a fiber treatment agent
2. A step of bringing the wet fibers into contact with each
   other
3. A step of causing liquid crosslinking between the fibers
   aligned in the same direction
4. A step of growing a fiber bundle by repeating the steps
   1 to 3

When a force is applied to the mixture of the fibers and the
fiber treatment agent by stirring the mixture, the fiber
treatment agent efficiently adheres to the surface of the
fibers, and the contact and the alignment of the fibers can be
promoted.

The method for producing a fiber assembly according to
the second aspect of the present invention is a method for
producing a fiber assembly by putting fibers and a fiber
treatment agent into a rolling tank and rotating the rolling
tank so that the mixture is granulated.

Even this method for producing a fiber assembly includes
the following steps 1 to 4.

1. A step of wetting fibers with a fiber treatment agent
2. A step of bringing the wet fibers into contact with each
   other
3. A step of causing liquid crosslinking between the fibers
   aligned in the same direction
4. A step of growing a fiber bundle by repeating the steps
   1 to 3

When a centrifugal force due to rotation and a collision
force due to sliding down are applied to the mixture of the
fibers and the fiber treatment agent, the fiber treatment agent
efficiently adheres to the surface of the fibers, and the contact
and the alignment of the fibers can be promoted.

The method for producing a fiber assembly according to
the third aspect of the present invention is a method for
producing a fiber assembly by liquid-crosslinking fibers to
grow particles while performing an operation of applying a
strain rate to fibers and a fiber treatment agent so that the
fibers and the fiber treatment agent are granulated.

Even this method for producing a fiber assembly includes
the following steps 1 to 4.

1. A step of wetting fibers with a fiber treatment agent
2. A step of bringing the wet fibers into contact with each other
3. A step of causing liquid crosslinking between the fibers aligned in the same direction
4. A step of growing a fiber bundle by repeating the steps 1 to 3

When the strain rate is applied to the fibers and the fiber treatment agent, the fiber treatment agent efficiently adheres to the surface of the fibers, and the contact and the alignment of the fibers can be promoted.

In the invention of the present application, the definitions of "strain rate", "liquid crosslinking", and "self-assembled carbon fiber bundle" are as follows.

<Strain Rate>

The strain rate in the present invention is defined as a value obtained by dividing a maximum speed at which the fibers move per unit time by a representative length in the granulation step.

$$\text{Strain rate } [1/s] = \text{maximum speed } [m/s]/\text{representative length } [m]$$

Here, the representative length denotes a charging height when the fibers are put into the container and is calculated as a value obtained by dividing the weight of the fibers that have been put into the container by the bulk density of the fibers and further dividing the obtained value by the average cross-sectional area of the container.

$$\text{Charging height } [m] = \text{weight } [kg] \text{ of fibers/bulk density } [kg/m^3] \text{ of}$$
$$\text{fibers/average cross-sectional area } [m^2] \text{ of container}$$

The average cross-sectional area is a value obtained by dividing the internal volume $[m^3]$ of the container by the height of the inner surface of the container along a rotating shaft or a vibrating shaft.

For example, in a case of stirring granulation in which the granulation is carried out by rotation of the stirring blade, the maximum speed is the outer peripheral speed of the stirring blade. In a case of rolling granulation in which the granulation is carried out by rotation of the container, the outer peripheral speed of the container is the maximum speed. In a case of granulation carried out by vibration, the rate calculated from the amplitude and the cycle of the vibration is the maximum speed. In a case of granulation carried out with a fluidized bed, the blowing speed of the airflow is the maximum speed. When an object is moving, the maximum speed can be determined by capturing an image of the motion of the object with a video camera and deriving the distance that a set reference point moves per unit area from image processing.

<Strain Amount>

The strain amount is obtained by multiplying the strain rate by the treatment time. The strain amount is an indicator for granulation.

$$\text{Strain amount } [-] = \text{strain rate} \times \text{treatment time } [s]$$

<Liquid Crosslinking>

The liquid crosslinking denotes that a liquid is present in a narrow void of a contact portion between a powder particle and a solid surface or between particles. Since a negative pressure caused by a capillary force is applied to the liquid crosslinking formed between particles, an attractive force (liquid crosslinking force) is applied to the particles, and thus the liquid crosslinking is in a state of being fixed. The liquid crosslinking in the present invention denotes liquid crosslinking occurring in a void between a fiber and a fiber, and the liquid crosslinking force applied when fibers are in contact such that the fibers intersect each other acts at points and is thus weak while the liquid crosslinking force applied when fibers are in contact in parallel with each other acts in lines and is thus strong. Since the liquid crosslinking occurring in fibers continuously occurs in the length direction of the fibers, even when the fibers are not in parallel with each other, an effect that the fibers are aligned in the same direction by changing the angles of the fibers such that the surface area of the liquid is minimized, using the action of the surface tension of the liquid.

<Self-Assembled Carbon Fiber Bundle (SACFB)>

SACFB is an aspect of the fiber assembly and is formed through a process in which a plurality of short carbon fibers are collected by themselves to form a bundle. The plurality of all short carbon fibers may be monofilaments in the stage before the formation of SACFB. That is, SACFB can be formed by aggregating the plurality of carbon fiber filaments into a bundle. As another example, SACFB may also be formed by aggregating a plurality of fine carbon fiber bundles formed of a small number of filaments, which are respectively, for example, less than 100. Alternatively, SACFB may be formed by aggregating the plurality of carbon fiber monofilaments and the plurality of fiber carbon fiber bundles. At the terminals of SACFB, the positions of the tips of a plurality of carbon fibers constituting a bundle are not aligned as shown in FIGS. 6a to 6d.

<Stirring Tank and Stirring Conditions>

Hereinafter, the stirring granulator suitably used for the method for producing a fiber assembly according to the first aspect of the present invention will be described with reference to FIG. 1.

It is preferable that the stirring granulator used in the method for producing a fiber assembly according to the first aspect of the present invention include a rotating shaft 2 on a central axis of a stirring tank 1 having a bottomed cylindrical shape as shown in FIG. 1a and that a plurality (three in FIG. 1a) of propeller-like stirring blades radially extend from the rotating shaft 2 at equal intervals. Disk-like stirring blades perpendicular to the rotating shaft may be employed. Disks with undulations and protrusions may also be employed.

Figure 1B:
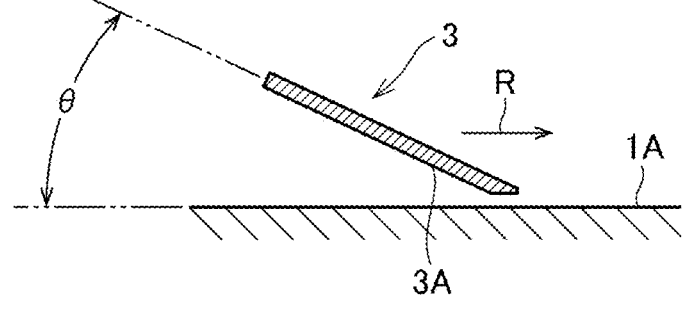

As shown in FIG. 1b, the stirring blade 3 is provided in a state of being inclined in the rotation direction with respect to a bottom surface 1A of the stirring tank 1. The nipped angle θ between a surface 3A that is a rear surface in a rotation direction R and the bottom surface 1A of the stirring tank 1 (hereinafter, also simply referred to as "tilt angle") is preferably in a range of 1° to 60°. When the tilt angle θ of the stirring blade 3 is 1° or more, mixed fiber particles can be stirred while being circulated in the stirring tank. When the tilt angle θ of the stirring blade 3 is 60° or less, the rotation speed can be adjusted within a range where a load is not applied to the device by suppressing the resistance to the stirring blade. The tilt angle θ is more preferably in a range of 10° to 50° and still more preferably in a range of 20° to 40°.

In FIG. 1a, the stirring blade 3 is bent at an angle α at about the center in the longitudinal direction thereof. The stirring blade is not limited to a stirring blade that is bent as described above, and a linear plate-like stirring blade may be employed. The stirring blade may be bent in an arc shape.

The stirring granulator may also be provided with an auxiliary stirring blade (chopper) for performing auxiliary stirring on a wall surface of the stirring tank. In the first aspect of the present invention, any type of stirring granulator can be used.

Further, the stirring tank of the stirring granulator may include a scraper on the bottom surface or a side surface thereof. When the stirring tank includes a scraper, granulation efficiency can be increased.

In the stirring granulator, it is preferable that the condition for the rotation direction is set such that the peripheral speed of the tip of the stirring blade (the part of 3a in FIG. 1a) (hereinafter, also simply referred to as "peripheral speed") is in a range of 1 to 20 m/sec. When the peripheral speed is 1 m/sec or more, the mixed fiber particles can be stirred while being circulated in the stirring tank. When the peripheral speed is 20 m/sec or less, the particle shape of the fiber assembly can be uniformly formed. The peripheral speed of the stirring blade is more preferably in a range of 4 to 12 m/sec and still more preferably in a range of 4 to 8 m/sec. The peripheral speed of the chopper is set to be preferably in a range of 5 to 30 m/sec.

In the stirring granulator, the stirring time is not particularly limited, and the stirring may be performed for the time taken to obtain a desired fiber assembly.

The temperature during the stirring is not particularly limited, and the stirring can be performed at room temperature. An increase in temperature of the container or the mixture due to the influence of the stirring is acceptable.

The kind of fiber treatment agent, the stirring time, the temperature for stirring, and the like can also be adjusted such that the fiber treatment agent when granulated is in a liquid state and the fiber treatment agent at a stage of maintaining the state of particles as the fiber assembly (granulated state) is in a solid state.

The stirring conditions are adjusted to obtain a fiber assembly in an aligned state without obtaining spherical carbon fiber balls with crimped fibers. Carbon fiber balls are likely to be obtained in a case where an assembly does not contain a fiber treatment agent and particularly a liquid, an assembly is obtained by putting a large amount of the fiber treatment agent and a liquid into a container and stirring the fibers, or the average fiber length of raw materials is 1 mm or less.

The stirring granulator may be a granulator having a cylindrical container and a stirring blade that is rotatable due to a rotating shaft.

Examples of the stirring blade include a paddle type stirring blade, a propeller type stirring blade, a turbine type stirring blade, an anchor type stirring blade, and a ribbon type stirring blade.

Examples of the stirring granulator include a batch type stirring granulation machine such as an SP Granulator (Dalton Corporation), a High speed mixer (EARTHTECH-NICA Co., Ltd.), a Vertical granulator (Powrex Corp.), a Loedige mixer (Matsubo Corporation), a Super mixer (Kawata MFG. Co., Ltd.), a Power kneader (Fuji Paudal Co., Ltd.), a Henschel mixer (Mitsui Mike Machinery Company, Limited), a universal mixing stirrer (Shinagawa Machinery Works Co., Ltd.), a Spartan granulator (Fuji Paudal Co., Ltd.), or a Vitomix (Hosokawa Micron Corporation), and a continuous stirring granulator such as a Flexomix (Hosokawa Micron Corporation) or a Modulomix (Hosokawa Micron Corporation).

Examples of a combined granulator of the stirring granulator and the fluidized bed granulator include a Multiplex granulator (Powrex Corp.), a Spira Cota (Powrex Corp.), a Spiral flow (Freund Corporation) and a New Marumerizer (Fuji Paudal Co., Ltd.).

When a stirring tank having a stirring blade (agitator) rotating in the horizontal direction and an auxiliary stirring blade (chopper) rotating in the vertical direction as the stirring blades is used as the stirring tank, the stirring and granulating can be efficiently carried out by performing stirring with the stirring blade rotating in the horizontal direction and the auxiliary stirring blade rotating in the vertical direction. The auxiliary stirring blade rotating in the vertical direction has a role of crushing granules that have largely grown and making the size of the fiber assembly uniform.

The raw materials before being put into the stirring granulator may be raw materials that have not been subjected to wet mixing. That is, a plurality of fibers in a dry state can be used as the raw materials instead of fiber assembly s in a wet state, and can be directly put into a stirring tank and mixed. The timing of completion of the granulation is not particularly limited, but it is preferable that the timing at which the fiber assembly is formed to the extent that the particle size distribution can be specified is determined as the timing.

<Drying Step>

In the method for producing a fiber assembly according to the first aspect of the present invention, it is preferable that a drying step of evaporating a liquid derived from the fiber treatment agent contained in the obtained granules be performed after the stirring and granulating are performed as described above.

The conditions for the drying step vary depending on the kind of the fiber treatment agent used. The drying step may be performed using a dryer at 50° C. to 150° C. for 1 to 5 hours.

Examples of drying equipment include a box type dryer, a belt conveyor dryer, a tunnel dryer, a fixed tank stirring dryer, a drum rotary dryer, a rotary kiln, a fluidized bed dryer, a stirring hot air dryer, a flash dryer, an infrared dryer, a microwave dryer, and a vacuum dryer. Further, natural drying may be employed.

<Classification Step>

A plurality of fiber assemblies can be classified to increase the uniformity of the plurality of fiber assemblies. A sieve used for classification can be formed to include a vibration mechanism, a container bonded to the vibration mechanism, and a sieve mesh partitioning the inner space of the container. When the container has a cylindrical shape, a cylindrical opening portion is disposed to face in the vertical direction. The sieve mesh is disposed on the opening portion at one end of the container, and the fiber assemblies are supplied onto the sieve mesh. The classification is carried out by vibrating the container such that the fiber assemblies are directed toward the outer periphery, discharging large fiber assemblies from the sieve mesh, and dropping small fiber assemblies down the sieve mesh.

When the container has a trough shape, the sieve mesh is disposed such that the inner space of the container is partitioned in the longitudinal direction. The fiber assemblies are supplied from one end of the inclined container in the longitudinal direction, and the fiber assemblies are allowed to move inside the container vertically downward to be discharged from the other end portion of the container. The large fiber assemblies remain on the sieve mesh and the small fiber assemblies are dropped down the sieve mesh by passing through the mesh due to vibration of the container. Classified fiber assemblies are obtained by respectively collecting the fiber assemblies on the sieve mesh and the fiber assemblies below the sieve mesh.

The sieve mesh is prepared by adjusting the mesh shape and the mesh size such that the fiber assemblies can be sieved into a desired size. When the fiber assemblies have an ellipsoidal shape, it is preferable that the mesh have a rectangular shape or a rhombus shape. The mesh may have a square shape or a circular shape.

Examples of the sieve include a Vibrating screen (Dalton Corporation) and a Finger screen (Taiyo Machinery Co., Ltd.). The classification step can also be used after the uniformity of the fibers is increased by applying the classification step to raw material fibers.

<Rolling Tank>

Examples of the rolling tank used in the second aspect of the present invention include a pan type rotating member and a drum type rotating member.

FIG. 2 is a schematic view showing an embodiment of a pan granulator used in the method for producing a fiber assembly according to the second aspect of the present invention. FIG. 2a is a side view showing the pan granulator. FIG. 2b is a view showing the internal structure of a granulation pan.

FIG. 3A is a cross-sectional view showing fixed side walls of the rolling tank and a rotating container used in the method for producing a fiber assembly according to the second aspect of the present invention.

FIG. 3B is an internal perspective view showing an embodiment of a rolling and stirring granulator used in the method for producing a fiber assembly according to the second aspect of the present invention.

The pan granulator in FIG. 2 is configured such that a granulation pan 11 rolls by a rolling shaft 12. The reference numeral 13 represents a motor, the reference numeral 14 represents a speed reducer, the reference numeral 15 represents a pan support, the reference numeral 16 represents a machine base, and the reference numeral 17 represents an angle adjusting device.

An arm 21 having a sprayer 22 and a scraper 23 is provided inside the granulation pan.

The movement speed of the cylindrical side wall of such a rotating member is preferably in a range of 0.20 to 1.60 m/s and preferably in a range of 0.50 to 1.00 m/s. when the movement speed of the cylindrical side wall is greater than or equal to the above-described lower limit, the shape of the fiber assembly can be made uniform while the fiber mixture is moved upward by the centrifugal force and crushed due to the impact caused by the sliding down. When the movement speed of the cylindrical side wall is less than or equal to the above-described upper limit, since the centrifugal force appropriately works so that the fiber mixture moves upward, the fiber mixture is efficiently crushed and granulated due to the sliding down, and thus the productivity can be increased.

As shown in FIG. 3A, it is preferable that the rolling tank includes fixed side walls 31 and a rotating container 32 that rotates inside the side walls in the horizontal direction. In this case, the outer peripheral speed of the rotating container is preferably in a range of 1 to 20 m/s and more preferably in a range of 5 to 10 m/s. When the outer peripheral speed of the rotating container is greater than or equal to the above-described lower limit, movement of the fiber mixture in the circumferential direction and collision of the fiber mixture with the side walls due to the centrifugal force continuously occur so that the fiber mixture is crushed and granulated, and thus the shape of the fiber assembly can be made uniform. When the outer peripheral speed of the rotating container is less than or equal to the above-described upper limit, the centrifugal force appropriately works and is balanced with the gravity applied to the fiber mixture so that the fiber mixture is efficiently crushed and granulated, and thus the productivity can be increased.

The rolling granulator may be a granulator including a rotatable container, and a cylindrical container can be used. The rotatable container can function as a rolling tank and a stirring tank when provided with the stirring blade described above, and can be used for stirring granulation as an aspect of a rolling stirring granulator described below.

Examples of the cylindrical container include a pan type container such as a typical pan, a multistage pan, an irregular pan, a parabolic pan, a double pan, or a truncated conical pan, and a drum type container.

Examples of the rolling granulator include a pan type granulator (Nihon Spindle Manufacturing Co., Ltd.), a Spira Cota (Okada Seiko Co., Ltd.), a Spiral flow (Freund Corporation), and a New Marumerizer (Fuji Paudal Co., Ltd.).

<Rolling Stirring Granulator>

The rolling stirring granulator will be described with reference to FIG. 3B. According to an aspect, the rolling stirring granulator includes a container 40 that is rotatable in a state of storing raw material fibers and the fiber treatment agent inside, and a rolling shaft portion 42 parallel to a central axis line 41 inside the container 40 and at a position eccentric from the central axis line 41 of the container 40 as shown in FIG. 3B. It is preferable that the rotating shaft portion 42 is rotatable in a direction opposite to the rotation direction of the container 40. When the rotating shaft portion 42 rotates in a direction opposite to the rotation direction, the impact force between the stirring blade and the fiber assembly increases, and thus fibers can be aligned due to strong shear in a short time. The rotating shaft portion 42 may rotate in the same rotation direction as the direction of the container 40. When the rotation direction of the stirring blade is opposite to the rotation direction of the container, the number of filaments contained in the fiber assembly is decreased, and the distribution of the shape and the number of filaments contained in the fiber assembly tends to be uniform. When the rotation direction of the stirring blade is the same as the rotation direction of the container, the number of filaments contained in one fiber assembly is increased, and the fibers are likely to be clumped. Liquid crosslinking between fiber assemblies with a small number of filaments and uniform distribution is considered to progress by performing stirring such that the rotation direction of the stirring blade is set to be the same as the rotation direction of the container after performing crosslinking such that the rotation direction of the stirring blade is set to be opposite to the rotation direction of the container. In this manner, a uniform fiber assembly with a high bulk density can be obtained. The rotating shaft portion 42 has a stirring blade 44 extending to the vicinity of a bottom plate 43 of the container 40 and moving in a region of the mixture of the fibers and the fiber treatment agent. The fibers can be aligned by rotating the container 40 so that the mixture is circulated and rotating the stirring blade 44 so that the shear is applied to the mixture. The blade of the stirring blade 44 can be applied in the aspect described in the section of the stirring granulator. A scraper 45 is provided on a side surface of the container 40. A scraper may be provided on the side surface, the bottom surface, or both the surfaces inside the container 40. The scraper 45 may scrape off the raw materials that have adhered.

The rolling stirring granulator rotates under a condition that the peripheral speed of the container 40 (container peripheral speed) is set to be in a range of 0.4 to 1.2 m/sec. when the peripheral speed thereof is 0.4 m/sec or more, stirring can be carried out while mixed fiber particles are circulated in the stirring tank. Meanwhile, when the peripheral speed thereof is 1.2 m/sec or less, the mixed fiber particles can efficiently be brought into contact with the stirring blade or the scraper, and thus the treatment time can be reduced. The peripheral speed can be set to be in a range of 0.5 to 1.0 m/s or in a range of 0.7 to 0.9 m/sec. The peripheral speed of the stirring blade tip of the stirring blade 44 (tip peripheral speed) is set to be preferably in a range of 1 to 30 m/sec. when the tip peripheral speed is 1 m/sec or more, the fibers can be aligned in a short time, and the density of the fiber assemblies can be increased. Meanwhile, when the tip peripheral speed is 30 m/sec or less, the particle shape of the fiber assembly can be made uniform. The peripheral speed of the stirring blade 44 can be set to be in a range of 10 to 20 m/sec or in a range of 1 to 8 m/sec.

The rolling stirring granulator may be a granulator including a container and a stirring blade that is rotatable by a rotating shaft, and examples of the stirring blade include a paddle type stirring blade, a propeller type stirring blade, a turbine type stirring blade, an anchor type stirring blade, and a ribbon type stirring blade. Examples of the rolling stirring granulator include an intensive mixer (Nippon Eirich Co., Ltd.) and a leaning trunk type rolling stirring granulator (Kitagawa Corporation).

<Strain Rate>

In the method for producing a fiber assembly according to the third aspect of the present invention, the strain rate applied to the fibers and the fiber treatment agent is preferably 1 [l/s] or more and 700 [l/s] or less. When the strain rate is greater than or equal to the above-described lower limit, the fibers are likely to be aligned. When the strain rate is less than or equal to the above-described upper limit, uniform particles (fiber bundles) can be obtained. The strain rate is particularly preferably in a range of 10 to 500 [l/s] and more preferably 20 to 200 [l/s].

The charging height when the fibers are put into the container is preferably 1/50 or more of the container height and two times or less of the container height. When the charging height is greater than or equal to the above-described lower limit, the fibers are likely to be aligned. When the charging height is less than or equal to the above-described upper limit, uniform particles (fiber bundles) can be obtained. The charging height is particularly preferably 1/10 or more and less than or equal to the container height and more preferably 1/5 or more of the container height and 4/5 or less of the container height.

The amount of the strain applied to the fibers and the fiber treatment agent is preferably 5000 [-] or more and 230000 [-] or less. When the strain amount is greater than or equal to the above-described lower limit, the fibers are likely to be aligned. When the strain amount is less than or equal to the upper limit, uniform particles (fiber bundles) can be obtained. The strain amount is particularly preferably in a range of 5000 to 100000 [-] and more preferably in a range of 5000 to 20000 [-]

An operation of imparting the strain rate to the fibers and the fiber treatment agent is not particularly limited, and specific examples thereof include the following methods.

(1) Operation of Imparting Shear Rate by Moving Stirring Blade so that Stirring Blade is Brought into Contact with Fibers and Fiber Treatment Agent (Stirring Granulation)

Specifically, a method of putting the fibers and the fiber treatment agent into the stirring tank 1 having the stirring blades 3 as shown in FIG. 1 in the stirring granulator and performing stirring is exemplified.

The stirring granulator is as described in the section of the method for producing a fiber assembly according to the first aspect of the present invention, and the preferable aspects and the stirring conditions are as described above.

When the stirring granulation is performed, the strain rate is determined as a value obtained by dividing the peripheral speed (peripheral speed of the tip 3a of the stirring blade 3) [m/s] of the outermost diameter of the stirring blade by the charging height [m] of the stirring blade and the raw materials inside the stirring tank 3.

Strain rate $[/s] =$ peripheral speed $[m/s]$ of stirring blade/charging height $[m]$ (2) Operation of Imparting Vibration Speed by Vibrating Container into which Fibers and Fiber Treatment Agent have been Put (Granulation by Vibration)

Specifically, the fibers and the fiber treatment agent are put into a sealable container. The sealable container is not particularly limited, and a cylindrical container with a screw-on lid can be used. The sealed container is installed in a sieve shaker or the like and allowed to vibrate for a certain time. The speed (v) is determined according to the following equation by assuming a simple harmonic motion using an amplitude A and a period T of the vibration during this time. t represents an elapsed time, and the maximum speed is obtained by "t=0", "T/2", and the like.

$$v = (2\pi/T)A\cos(2\pi t/T)$$

When granulation is performed by vibration, the strain rate is determined by a value obtained by dividing the maximum speed (v) [m/s] due to vibration by the charging height.

Strain rate $[/s] =$ maximum speed $[m/s]$ due to vibration/charging height $[m]$ The amplitude and the period may be measured by any method. A set value of the sieve shaker may be used or the amplitude and the period may be determined from image processing by capturing an image of the vibration with a video camera.

(3) Operation of Imparting Rotation Speed by Performing Operation of Rotating Container into which Fibers and Fiber Treatment Agent have been Put (Rolling Granulation)

Specifically, a method of using the pan granulator shown in FIG. 2 described in the section of the method for producing a fiber assembly according to the second aspect of the present invention is exemplified.

In such rolling granulation, the strain rate corresponds to a value obtained by dividing the peripheral speed [m/s] of the pan outer periphery by the outer peripheral length of the pan.

$$\text{Strain rate } [/s] =$$

$$\frac{\text{peripheral speed } [m/s]}{\text{outer peripheral length } [m] \text{ of pan}}$$

(4) Operation of Imparting Airflow Shear Rate by Blowing Gas into Container into which Fibers and Fiber Treatment Agent have been Put (Fluidized Bed Granulation)

Specifically, a fluidized bed granulation method is a method of spraying a granulating liquid and growing the liquid into granules by means of aggregation or coating after formation of a layer in a state where particles flow by sending gas from the bottom of a granulation chamber and winding up raw material particles in the air.

In such fluidized bed granulation, the airflow blowing speed is the maximum speed. The strain rate is defined as a value obtained by dividing the blowing speed by the charging height.

$$\text{Strain rate } [/s] = \text{blowing speed } [m/s]/\text{charging height } [m]$$

<Fibers>

The fibers used for manufacturing the fiber assembly (hereinafter sometimes referred to as "raw material fibers") contain carbon fibers. As long as the raw material fibers contain carbon fibers, it may further contain inorganic fibers or organic fibers other than the carbon fibers.

Examples of inorganic fibers other than the carbon fibers include glass fibers, carbon fibers, boron fibers, silicon carbide fibers, silicon nitride fibers, alumina fibers, stainless steel fibers, and piano wires.

Organic fibers include chemical fibers and natural fibers.

Chemical fibers include polyester fibers such as polyethylene terephthalate (PET) fiber, polybutylene terephthalate fiber, polytrimethylene terephthalate fiber, and polylactic acid fiber; polyamide fibers such as nylon 6 fiber and nylon 66 fiber; polyacrylic fiber; polyolefin fibers such as polypropylene fiber; polyphenylene sulfide fibers; and polycarbonate fibers, etc.

Natural fibers include plant fibers such as cotton, hemp, kenaf, bamboo cotton, bamboo rayon, and rayon, and animal fibers such as wool and silk.

Only one type of these fibers may be used, or two or more types may be mixed and used.

Among these fibers, it is preferable to use at least carbon fiber, since it is particularly useful for production as a fiber-reinforced resin composition and can provide a fiber-reinforced resin composition having high specific strength and high specific modulus. The ratio of carbon fibers to raw material fibers is preferably 70% by mass or more, particularly 90 to 100% by mass.

The raw material fibers are not limited to virgin fibers and may be recycled fibers. Particularly, according to the first aspect, a carbon fiber assembly with a high bulk density, in which fibers are aligned while maintaining the length without being cut, can be produced even from the recycled fibers. Examples of the recycled fibers include fibers obtained by decomposing a matrix using heat, a subcritical fluid or a supercritical fluid and fibers obtained by cutting an end material of a fiber base material. The matrix can be completely removed until the recycled fibers are in the fluffy form. In a case where resin residues that cannot be completely removed are present, the residues may be removed by being subjected to a heat treatment in an oxidizing atmosphere.

The raw material fibers are obtained by collecting a plurality of discontinuous fibers (short fibers), and may be in the fluffy form or may be aligned. When the raw material fibers are clumped to the extent that the monofilaments are not scattered, the conversion efficiency to a fiber assembly is increased. The discontinuous fibers may be obtained by cutting bundles of continued fibers, or fibers in a discontinuous form may be used. The continued fibers may be a tow or may be taken out from a prepreg, a molded article, or the like.

For example, the recycled fibers obtained by decomposing a matrix with heat are in a state of dried fluffy fibers immediately after being heated. A fiber assembly with aligned fibers can be obtained without changing the form of fibers from the fiber recycling step by performing the stirring granulation. The reason for this is that entanglement between fibers and adhesive matter such as a resin carbide can be removed by rotating the stirring blade.

FIG. 4 shows an example of the form of recycled fibers. The recycled fibers are a mass of fibers that are randomly superimposed.

FIG. 5 shows an example of the form of virgin fibers. The virgin fibers are a mass of fiber bundles in which fibers are aligned.

The raw material fibers may be loosened before being stirred with the stirring granulator or the like. For example, the raw material fibers are loosened by stirring fibers containing no liquid with the stirring blade in the stirring tank before the fiber treatment agent is put into the stirring tank. When fibers in a smaller unit are obtained by rotating the stirring blade to loosen the fibers bound to each other with adhesive matter such as a resin carbide, the fibers can be easily aligned by being stirred with the stirring blade after the addition of the fiber treatment agent. At the same time, the uniformity of the fiber assembly can be improved.

A sizing agent or a matrix resin of FRP may adhere to the raw material fibers.

The residual amount of the resin in the raw material fibers such as carbon fibers is, for example, in a range of 0.01% to 10%.

The fiber diameter of the raw material fibers such as carbon fibers is not particularly limited. The fiber diameter of the raw material fibers is a typical fiber diameter, for example, in a range of 5 μm to 20 μm. The bulk density of the raw material fibers is, for example, in a range of 0.01 to 0.90 g/cm$^3$. When the bulk density of the raw material fibers is in a range of 0.01 to 0.040 g/cm$^3$, the raw material fibers are easily converted to a fiber assembly with a bulk density greater than that of the raw material fibers.

The average fiber length of the raw material fibers such as carbon fibers is preferably in a range of 1 to 100 mm and particularly preferably in a range of 2 to 50 mm. when the raw material fibers are used in a fiber-reinforced resin composition (pellet) used for extrusion molding, the average fiber length of the raw material fibers is preferably in a range of 2 to 12 mm. When the raw material fibers are used in a fiber-reinforced resin material (prepreg) used for press molding, the average fiber length of the raw material fibers is preferably in a range of 12 to 50 mm and more preferably in a range of 12 to 30 mm from the viewpoint of dispersing fiber assemblies and easily and uniformly accumulating the fiber assemblies during production of a prepreg. When the fiber length of the raw material fibers is greater than or equal to the above-described lower limit, the strength of the fiber-reinforced resin composition can be sufficiently increased, and the alignment of fibers can be highly controlled. When the average fiber length of the raw material fibers is less than or equal to the above-described upper limit, since entanglement with the device is suppressed during the production of the fiber assembly, the production efficiency can be increased, and the particle shape of the fiber assembly can be uniformly controlled.

It is preferable that a weighted average fiber length is employed as the average fiber length. The average fiber length can be measured by the method described in the section of examples below. The fiber length can also be calculated by performing binarization processing using image processing software such as imageJ, on an image captured by observation with a microscope.

<Fiber Treatment Agent>

The fiber treatment agent is not particularly limited as long as it can granulate fibers into a fiber assembly. The fiber treatment agent may be liquid. For example, a solvent, an organic compound dissolved in a solvent, an organic compound mechanically dispersed in a solvent, an organic compound dispersed in a solvent by a surfactant, or a solvent whose viscosity is reduced by heating can be used as a fiber treatment agent. From the viewpoint of being able to form liquid cross-links between fibers at room temperature, the fiber treatment agent is preferably liquid at room temperature.

Here, examples of organic compounds include the following.

Natural compounds such as starch, cyclodextrin, amino acids, peptides, proteins, natural rubber, soybean oil, and coconut oil;

Thermoplastic resins such as ABS resin, vinylidene chloride latex, vinyl chloride resin, butadiene resin, fluorine resin, polyacetal, polyamides such as nylon 6 and nylon 66, polyarylate, polyetherimide, polyether ether ketone, polyethylene, polyethylene oxide, polyesters such as polyethylene terephthalate and polybutylene terephthalate, polycarbonate, polystyrene, polysulfone, polyvinyl ether, polyphenylene oxide, polyphenylene sulfide, polypropylene, methacrylic resin, precursors and monomers of such resins, and modified products of such resins;

Thermosetting resins such as epoxy resin, xylene resin, vinyl ester resin, phenolic resin, unsaturated polyester resin, furan resin, polyimide, polyurethane, melamine resin, urea resin, precursors and monomers of such resins, and modified products of such resins;

Synthetic rubbers such as styrene/butadiene latex, butadiene latex, neoprene/butadiene latex, chloroprene rubber, urethane rubber, silicone rubber, fluorine rubber, and acrylic rubber;

Silane coupling agents such as vinyltrichlorosilane, vinyltrimethoxysilane, vinyltriethoxysilane, tris-(2-methoxyethoxy)vinylsilane, γ-glycidoxypropyltrimethoxysilane, 3-(trimethoxysilyl)propylmethacrylate, γ-(2-aminoethyl)aminopropyltrimethoxysilane, γ-chloropropyltrimethoxysilane, γ-mercaptopropyltrimethoxysilane, and γ-aminopropyltriethoxysilane;

Titanium-based coupling agents such as isopropyltriisostearoyltitanate, isopropyltridecylbenzenesulfonyltitanate, isopropyltris(dioctylpyrophosphate)titanate, tetraisopropylbis(dioctylphosphite)titanate, tetraoctylbis(ditridecylphosphite)titanate, bis(dioctylbirophosphate)oxyacetatetitanate, isopropyltrioctanoyltitanate, isopropyldimethacrylisostearoyltitanate, isopropylisostearoyldiacryltitanate, isopropyltri(dioctylphosphate)titanate, isopropyltricumylphenyltitanate, isopropyltri(N-aminoethylaminoethyl)titanate:

Specific examples of fiber treatment agents include the following.

Examples of solvents include organic solvents such as alcohols, ketones and hydrocarbons, and water.

Granulation accelerators include organic thickeners such as carboxymethyl cellulose (CMC), hydroxyethyl cellulose (HEC), xanthan gum, guar gum, starch, polyvinyl alcohol, polyacrylamide, polyethylene glycol and polyethylene oxide; inorganic thickeners such as smectite clay minerals such as montmorillonite, saponite, hectorite, bentonite, beidellite, nontronite, sauconite, stevenside, laponite and synthetic smectite, and white carbons such as hydrous silica, anhydrous silica and hydrous silicate.

Examples of sizing agents include polyvinyl alcohol (PVA) such as unsaponified polyvinyl acetate, partially saponified PVA, fully saponified PVA, modified PVA (modified with itaconic acid, modified with phthalic acid, modified with acrylic acid, etc.); copolymers of vinyl acetate and ethylene, maleic acid, crotonic acid, or acrylic acid; cellulose derivatives such as methyl cellulose, ethyl cellulose, carboxymethyl cellulose, and hydroxyethyl cellulose; starch derivatives such as cornstarch and soluble starch; acrylic polymers such as sodium polyacrylate, polyacrylamide; rubber latex, epoxy resin, and polyurethane.

As a fiber treatment agent, one or more of solvents, clay minerals, resins, and surfactants is preferred from the viewpoint of forming liquid cross-links between fibers to facilitate fiber orientation, improving bulk density of fiber assemblies, and making particle shape uniform. From the viewpoint of safety, the fiber treatment agent includes water, an organic compound dissolved in water, an organic compound mechanically dispersed in water, and an organic compound dispersed in water by a surfactant is preferred. A polymer may be included as one aspect of the resin.

Examples of solvents include organic solvents such as alcohols such as methanol, ethanol and propanol, ketones such as acetone and methyl ethyl ketone, hydrocarbons such as hexane, cyclohexane, benzene, toluene and styrene, and water. Water is preferable from the viewpoint of forming a liquid cross-links.

Examples of clay minerals include montmorillonite, saponite, hectorite, bentonite, beidellite, nontronite, sauconite, stevenside, laponite and synthetic smectite.

Examples of resins include thermoplastic resins such as ABS resin, vinylidene chloride latex, vinyl chloride resin, butadiene resin, fluorine resin, polyacetal, polyamide resins such as nylon 6 and nylon 66, polyarylate, polyetherimide, polyether ether ketone, polyethylene, polyethylene oxide, polyesters such as polyethylene terephthalate and polybutylene terephthalate, polycarbonate, polystyrene, polysulfone, polyvinyl ether, polyphenylene oxide, polyphenylene sulfide, polypropylene, methacrylic resin; thermosetting resins such as epoxy resin, xylene resin, vinyl ester resin, phenolic resin, unsaturated polyester resin, furan resin, polyimide, polyurethane, melamine resin, urea resin; synthetic rubber such as; styrene/butadiene latex, butadiene latex, neoprene/butadiene latex, chloroprene rubber, urethane rubber, silicone rubber, fluorine rubber, and acrylic rubber. From the viewpoint of maintaining the shape of the fiber bundle, the resin preferably contains at least one selected from epoxy resin, urethane resin, and polyamide resin.

Examples of surfactants include anionic surfactants such as alkyl ether carboxylates, cationic surfactants such as aliphatic quaternary ammonium salts and imidazolinium salts, amphoteric surfactants such as carboxybetaine type, nonionic surfactants such as polyoxyethylene alkyl ethers, polyoxyethylene glycerin fatty acid esters, polyethylene glycol fatty acid esters, and the like can be mentioned.

The fiber treatment agent preferably has one or both of the following physical properties of (1) and (2).

(1) Surface tension at 23° C. is 120 mN/m or less.

(2) Viscosity at 23° C. is 10 Pa·s or less.

If the surface tension of the fiber treatment agent at 23° C. is 120 mN/m or less, liquid cross-links can be formed between the fibers, making it possible to easily move the fibers and orient the fibers. The surface tension of the fiber treatment agent at 23° C. can be 110 mN/m or less, 100 mN/m or less, 90 mN/m or less, 72 mN/m or less, 60 mN/m or less, 50 mN/m or less, or 40 mN/m or less. On the other hand, the surface tension of the fiber treatment agent at 23° C. can be 10 mN/m or more, 15 mN/m or more, 20 mN/m or more, or 30 mN/m or more.

Here, the surface tension at 23° C. is the value measured by the plate method (vertical plate method). When granulating by heating, a fiber treatment agent having a surface tension within the above range at the stirring temperature can be used.

If the surface tension of the fiber treatment agent is equal to or higher than the above lower limit, an appropriate capillary negative pressure is applied to the liquid cross-linking portion connecting the fibers, and the fibers are adsorbed and oriented to obtain a dense fiber assembly. If the surface tension is equal to or less than the above upper limit, the fiber treatment agent will appropriately wet the fiber surface, liquid cross-links will efficiently occur, and the fiber granulation efficiency will be excellent.

If the viscosity of the fiber treatment agent at 23° C. is 10 Pa·s or less, it is possible to make the particle shape of the fiber assembly uniform. The viscosity of the fiber treatment agent at 23° C. can be 8 Pa·s or less, 5 Pa·s or less, 2 Pa·s or less, or 0.5 Pa·s or less. On the other hand, the viscosity of the fiber treatment agent at 23° C. can be 0.0001 Pa·s or more.

Here, the viscosity at 23° C. is the value measured by a B-type rotational viscometer. When granulating by heating, a fiber treatment agent having the viscosity tension within the above range at the temperature at which it is stirred can be used.

If the viscosity of the fiber treatment agent is equal to or less than the above upper limit, friction between the fibers is moderately generated, and as a result, a uniform fiber assembly with a regular shape can be obtained. In addition, the fiber treatment agent wets and spreads on the surface of the fiber, so that liquid cross-links are efficiently generated and the effect of granulating the fiber is excellent.

The surface tension of the fiber treatment agent at 23° C. can be adjusted, for example, by mixing a surfactant or solvent.

The viscosity of the fiber treatment agent at 23° C. can be adjusted, for example, by mixing a granulation accelerator or solvent.

It is preferable to use 5 to 120 parts by mass of such a fiber treatment agent per 100 parts by mass of fibers. When the amount of the fiber treatment agent used is at least the above lower limit, an appropriate amount of liquid cross-links are generated between the fibers, and the flow and adsorption of the fibers can be promoted to appropriately orient the fibers. Thereby, a dense fiber assembly can be obtained. If the amount of the fiber treatment agent used is equal to or less than the above upper limit, the liquid cross-links between fibers do not disappear and the fiber assembly can be obtained that retain their particle shape without slurrying. It is more preferable to use 20 to 80 mass parts of fiber treatment agent per 100 mass parts of fibers. When the average fiber length of the raw material fibers is 2 to 12 mm, it is preferable to use 5 to 50 parts by mass of the fiber treatment agent per 100 parts by mass of fibers, and 10 to 40 parts by mass is more preferable from the viewpoint of easy drying and adjusting the fiber assembly to a size suitable for pellets. When the average fiber length of the raw material fibers is 12 to 50 mm, it is preferable to use 20 to 120 parts by mass of the fiber treatment agent per 100 parts by mass of the fibers, and it is more preferable to use 30 to 80 parts by mass from the viewpoint of easy drying and adjusting fiber assembly to a size suitable for prepregs.

The fiber treatment agent may be put into the agitating granulator in its entirety together with the fibers, may be put into the agitating granulator intermittently with a divided amount, or may be put into the agitating granulator continuously.

<Fiber Assembly>

According to the first aspect of the present invention, a fiber assembly with a high bulk density, in which the fibers are aligned while maintaining the length without being cut, can be produced by granulating the fibers and the fiber treatment agent.

The average fiber length of the fibers in the fiber assembly is preferably in a range of 1 to 100 mm and particularly preferably in a range of 2 to 50 mm. The average fiber length of the fibers in the fiber assembly is preferably in a range of 2 to 12 mm when the fibers are used in the fiber-reinforced resin composition (pellet) used for extrusion molding. The average fiber length of the fibers in the fiber assembly is preferably in a range of 12 to 50 mm when the fibers are used in the fiber-reinforced resin composition (prepreg) used for press molding.

As the degree of maintaining the length of fibers, from the viewpoint of increasing the uniformity of the fiber assembly, a ratio (Y/X) of an average fiber length Y of the fibers in the fiber assembly to an average fiber length X of the raw material fibers before being put into the stirring tank is preferably 0.55 or more, more preferably 0.70 or more, still more preferably 0.80 or more, and particularly preferably 0.90 or more. The ratio (Y/X) can be set to 1 or less.

The shape of the fiber assembly to be obtained is not particularly limited, but a prolate spheroidal shape or a strand shape is preferable in the applications as reinforced fibers.

As the prolate spheroidal shape, an ellipsoid may be exemplified. The diameter of the thickest portion of the ellipsoid is in a range of 0.1 mm to 10 mm, the length of the major axis is greater than the average fiber length of the fibers in the fiber assembly and is in a range of 3 mm to 150 mm, and the cross-sectional shape can be a circular, an elliptical, or the like. It is preferable that the shape of the fiber assembly when used for pellets be a prolate spheroidal shape from the viewpoint of feed efficiency to a kneader, the diameter of the thickest portion be in a range of 2 mm to 7 mm, the length of the major axis be greater than the average fiber length of the fibers in the fiber assembly, and the ratio thereof (length of major axis/average fiber length) be in a range of 1.1 times to 5.0 times and in a range of 3 mm to 18 mm. It is preferable that the shape of the fiber assembly when used for prepregs be a strand shape from the viewpoint of dispersing the fiber assemblies and easily and uniformly accumulating the fiber assemblies, the diameter of the thickest portion be in a range of 2 mm to 10 mm, the bundle length be greater than the average fiber length of the fibers in the fiber assembly, and the ratio thereof (bundle length/ average fiber length) be in a range of 1.1 times to 3.0 times and in a range of 12 mm to 150 mm.

It is preferable that the major axis of the fiber assembly is greater than the average fiber length of the fibers contained in the fiber assembly.

The bulk density of the fiber assembly can be set to be, for example, in a range of 0.03 to 0.7 g/cm³. The bulk density thereof varies depending on the raw material fibers used, but is preferably 0.1 g/cm³ or more and particularly preferably 0.2 g/cm³ or more from the viewpoint of transport efficiency of the fiber assembly. When the fibers are used for a molded article in which the content of fibers is small, the bulk density can be set to 0.1 g/cm³ or more and less than 0.3 g/cm³ or 0.1 g/cm³ or more and 0.29 g/cm³ or less. When the fibers are used for a molded article required to have strength, the bulk density can be set to be in a range of 0.3 g/cm³ to 0.6 g/cm³. In both cases, the bulk density is preferably 0.15 g/cm³ or more and particularly preferably 0.2 g/cm³ or more from the viewpoint that the amount of fibers to be fed once can be increased. The repose angle of the fiber assembly is preferably 60° or less and more preferably 50° or less. The repose angle thereof can be set to 10° or more.

The bulk density and the repose angle of the fiber assembly are measured by the methods described in the section of examples below.

The content of the fibers in the fiber assembly can be set to be, for example, in a range of 10% to 99% by mass. When the fibers are used for producing pellets, the content of the fibers in the fiber assembly can be set to be, for example, in a range of 80% to 99% by mass. When the fiber assembly is used for molding by being put into a molding die or the like, the content of the fibers in the fiber assembly can be set to be, for example, in a range of 10% to 70% by mass. When the fiber assembly contains a resin, the content of the resin is preferably in a range of 0.1 to 20 parts by mass and more particularly preferably in a range of 0.5 to 10 parts by mass with respect to 100 parts by mass of the fibers in the fiber assembly.

<Applications>

The fiber assembly, particularly the carbon fiber assembly, produced by the method for producing a fiber assembly according to the first aspect of the present invention can be effectively used as reinforced resins in fiber-reinforced resin composition molding materials, such as various prepregs (random, one direction), pellets, and stampable sheets.

<Method of Producing Prepreg Sheet>

A method for producing a prepreg sheet includes accumulating a plurality of the fiber assemblies produced by the method for producing a fiber assembly described above.

A sheet prepreg is an example of a prepreg that can be produced by using SACFB as a fiber assembly. In a suitable example, a sheet prepreg can be produced by through the following first to fourth steps.

First step: A step of applying a liquid thermosetting resin composition on respective surfaces of a first protective film and a second protective film.

Second step: A step of depositing a plurality of short carbon fiber bundles containing the SACFB on the surface of the first protective film on which the liquid thermosetting resin composition to form a carbon fiber mat.

Third step: A step of laminating the second protective film to the first protective film so that the surfaces coated with the liquid thermosetting resin composition face each other, with the carbon fiber mat in between, to form a laminate.

Fourth step: A step of pressurizing the laminate to impregnate the carbon fiber mat with the liquid thermosetting resin composition to obtain a sheet prepreg.

The first protective film and the second protective film are synthetic resin films, and the material can be appropriately selected from polyolefins such as polyethylene and polypropylene, polyvinylidene chloride, vinyl chloride resin, polyamide, and the like. The first protective film and the second protective film may be multilayer films. The specifications of the first protective film and the second protective film may be the same or different.

In the second step, a carbon fiber mat is formed by depositing a plurality of short carbon fiber bundles containing the SACFB, for example, by spraying on the surface of the first protective film coated with the liquid thermosetting resin composition.

The amount of the liquid thermosetting resin composition applied to the first protective film and the second protective film in the first step and the basis weight of the carbon fiber mat formed on the first protective film in the second step are adjusted considering the basis weight and fiber content of the sheet prepreg to be produced.

When the liquid thermosetting resin composition contains a thickener, the prepreg is aged after the fourth step until the viscosity of the liquid thermosetting resin composition becomes sufficiently high.

In the above procedure, the first protective film and the second protective film may be carrier films unwound from a roll.

Figure 8:
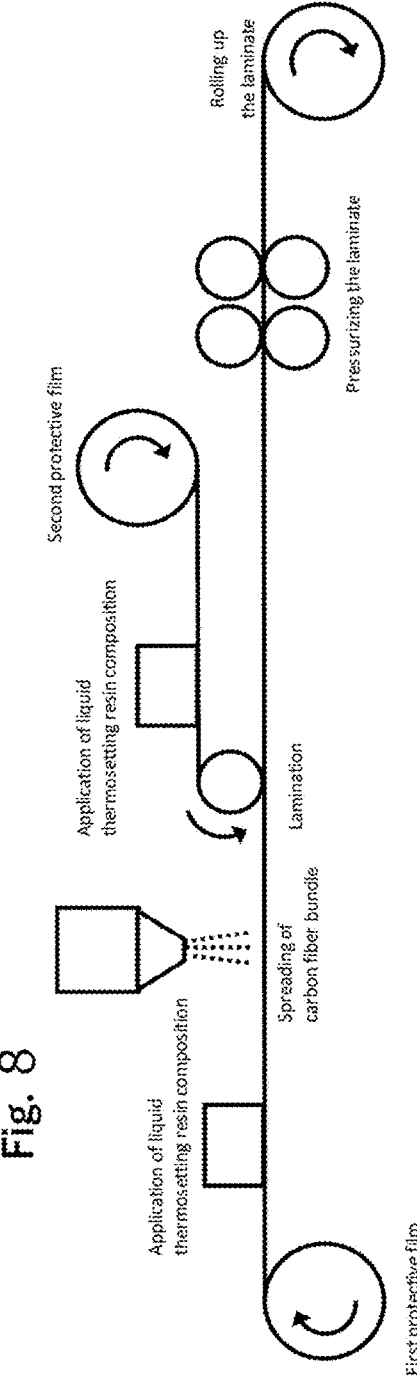
FIG. 8 is a conceptual view showing a sheet prepreg
production device.

In a suitable example, a long sheet prepreg can be continuously produced using the sheet prepreg producing apparatus shown conceptually in FIG. 8.

The sheet prepreg producing apparatus shown in FIG. 8 consists of a section for applying a liquid thermosetting resin composition to a first protective film being unwound from a roll, a section for spreading short carbon fiber bundles on the first protective film to form a carbon fiber mat, a section for applying a liquid thermosetting resin composition to a second protective film being unwound from a roll, a section for laminating the second protective film onto the first protective film to form a laminate, a section for pressing the laminate, and a section for winding up the laminate.

A press molding method can be preferably used as a molding method when a CFRP product is produced by the prepreg using SACFB, but the molding method is not limited. A molding method other than the press molding method such as an autoclave molding method can also be used as the molding method.

Fourth Aspect of Present Invention

Hereinafter, an embodiment of the fourth aspect of the present invention will be described.

A fiber bundle according to the fourth aspect of the present invention (hereinafter, also referred to as "fiber bundle W") includes a plurality of carbon fibers and a resin or a solvent, the fiber bundle has an ellipsoidal shape, and the ratio A'/A to be specified by the condition (1) described below is in a range of 0.75 to 0.93. The fiber bundle according to the fourth aspect is an aspect of the fiber bundle.

Condition (1): The fiber bundles are put on one side of a white plate, and obtain an image by capturing an image in the vertical direction to the plate. The image is binarized using image analysis software to obtain a binary image. The contour of the binary image is extracted to obtain the contour of the fiber bundles. The Feret's diameter is acquired from the obtained contour and the thus acquired length of the major axis is defined as A. A length of a major axis of an ellipse obtained by performing ellipse approximation to the binary image is defined as A'.

As the ratio A'/A approaches 1, the cross-sectional shape when the fiber bundle is cut in the same direction as the direction of the major axis is close to an elliptical shape or a circular shape. As the value of A'/A decreases, the cross-sectional shape tends to be closer to a shape with corners or protruding fibers at the tip of the major axis. When the ratio A'/A is 0.75 or more, in a case where a state where a plurality of fiber bundles (a plurality of fiber assembly s) are present is prepared, the fiber bundles are likely to slide, and thus occurrence of bridges that hinder dropping of the fiber bundles by supporting each other particularly in a hopper in a feeder for putting the fiber bundles into a kneader can be suppressed. When the ratio A'/A is 0.93 or less, the fiber bundles are aligned in the flow direction and tend to flow in the feeder, the fiber bundles are disposed such that the gap in the feeder is reduced, and thus a constant amount of fibers can be continuously supplied.

The ratio A'/A can be set to, for example, 0.93 or less, 0.92 or less, or 0.91 or less. The ratio A'/A can be set to, for example, 0.75 or more, 0.80 or more, 0.81 or more, or 0.85 or more.

From the viewpoint of the mechanical properties of a resin molded article, the length A of the major axis of the fiber bundle W is preferably 3 mm or more and more preferably 4 mm or more. From the viewpoint of preventing occurrence of bridges, the length A of the major axis can be set to 30 mm or less or 25 mm or less.

A ratio (S'/S) of an area S' of a virtual ellipse determined from the major axis and the minor axis of the contour to an area S of an ellipse obtained by ellipse approximation can be set to be in a range of 0.70 to 1.06 or in a range of 0.80 to 0.92.

The condition (1) can be carried out, for example, by the following method.

An image of the fiber bundles is captured at a magnification of 20 times using a digital microscope VHX-6000 and a ring lighting. The image is captured in a posture of the fiber bundles naturally disposed and stabilized on a white plate horizontally maintained in the vertical direction opposite to the white plate. The image analysis is performed using software (ImageJ), and a binary image is obtained by performing Otsu's binarization processing (Make Binary). The contours of the binary image are extracted (Analyze Particles, Outlines) to obtain the contour of one fiber bundle. The Feret's diameter (Feret's Diameter) is determined from the obtained contour. The length A' of the major axis (Major) of the ellipse obtained by ellipse approximation to the contour (Analyze Particles, Ellipses) using the least squares method is obtained.

The average fiber length of the fibers in the fiber bundle W is preferably in a range of 1 to 100 mm and particularly preferably in a range of 2 to 50 mm. When the fibers are used for producing pellets, the average fiber length of the fibers in the fiber bundle W is preferably in a range of 2 to 12 mm. It is preferable that a weighted average fiber length is employed as the average fiber length, and the average fiber length can be measured by the method described in the section of examples below. The average fiber length of the fibers can be set to be shorter than the major axis A, and a relationship of 0.2×A to 0.8×A mm can be satisfied.

The number of filaments contained in the fiber bundle W can be set to, for example, 8000 or more and 800000 or less. When the number of filaments at the center of the major axis of the fiber bundle W is greater than the number of filaments at the tip of the major axis thereof, an ellipsoidal shape ca be formed. The fibers in the fiber bundle W are aligned to form a fiber bundle. It is preferable that the fibers present on the surface of the fiber bundle are curved and aligned along the contour of the ellipsoid.

The ellipsoid has a major axis, a minor axis 1, and a minor axis 2, and it is preferable that a length B of the minor axis 1 be set to be greater than a length C of the minor axis 2 and be close to the length C of the minor axis 2 so that the fiber bundles are not blocked at a constriction in, for example, the hopper of the feeder. From the viewpoint of preventing occurrence of bridges, the length B can be set to 3.0 times or less, preferably 2.0 times or less, 1.1 times or more, and for example, 1.5 times of greater of the length C.

From the viewpoint of controlling the supply amount, the specific length B is preferably 1 mm or more and more preferably 2 mm or more. From the viewpoint of preventing occurrence of bridges, the length B is typically 9 mm or less, preferably 8 mm or less, and more preferably 6 mm or less.

From the viewpoint of controlling the supply amount, the length C is preferably 0.5 mm or more and more preferably 1 mm or more. From the viewpoint of preventing occurrence of bridges, the length C is typically 6 mm or less, preferably 4 mm or less, and more preferably 3 mm or less.

The ratio (B/A) of the major axis to the minor axis 1 can be set to be in a range of 2 to 12, and the ratio (C/A) of the major axis to the minor axis 2 can be set to be in a range of 1 to 6.

The particle density of the fiber bundle represented by Equation (2) can be set to be in a range of 0.3 to 1.8 g/cm³.

$$\text{Particle density} = G/(4\pi abc/3) \qquad \text{Equation (2)}$$

(In Equation (2), G represents the mass of the fiber bundle, a represents A/2, b represents B/2, and c represents C/2.)

From the viewpoint of improving the feed efficiency, the proportion of the number of fiber bundles W in the fiber assembly is preferably 45% or more, more preferably 50% or more, still more preferably 60% or more, and particularly preferably 80% or more. The number proportion can be set to less than 100%.

The number proportion is determined by extracting 100 to 10000 fiber bundles from the fiber assembly and dividing the number of fiber bundles W in the extracted fiber assembly by the number of extracted fiber bundles. The fiber bundles W with a size of 4.5 cm³ to 450 cm³ are scooped from the fiber assembly with a weighing container, the scooped fiber bundles are disposed on a white plate so as not to be superimposed on each other, and the ratio A'/A of each fiber bundle can be determined by the image analyzing method in the condition (1) using an image obtained by capturing a plurality of disposed fiber bundles with a digital camera. It is preferable that the fiber bundles are extracted from the fiber assembly in a state where assembly s of a plurality of assembly d fiber bundles and fine powder are removed.

<Method of Producing Fiber Bundle W>

The fiber bundle W is obtained by mixing fluff formed of short fibers with a liquid so that the short fibers are spontaneously bundled. Specifically, the fiber bundle W can be produced by granulation such as rolling granulation, stirring granulation, fluidized bed granulation, or the like. For example, the ratio A'/A can be set to be in a specific range by putting fluff formed of short carbon fibers and a liquid into a stirring granulator and stirring the mixture by setting the rotation speed of the stirring blade (agitator) to 120 to 470 rpm and the rotation speed of the chopper to 2000 to 3000 rpm. The amount of the liquid is preferably in a range of 5 to 120 parts by mass and more particularly preferably in a range of 20 to 80 parts by mass with respect to 100 parts by mass of the fibers. As the components constituting the liquid, the resin and the solvent described above can be used.

As the stirring granulator suitably used for producing the fiber bundle W, the stirring granulator shown in FIG. 1 described as the stirring granulator in the method for producing a fiber assembly according to the first aspect of the present invention may be used. The specific details of the stirring granulator, the stirring conditions, and the like are the same as described above.

In the conditions of the rotation direction of the stirring granulator, it is preferable that the peripheral speed of the tip of the stirring blade (the part of 3a in FIG. 1*a*) (hereinafter, simply referred to as "peripheral speed") is set to be in a range of 1 to 20 m/sec. When the peripheral speed is 1 m/sec or more, the mixed fiber particles can be stirred while being circulated in the stirring tank. When the peripheral speed is 20 m/sec or less, the particle shape of the fiber assembly can be made uniform. The peripheral speed of the stirring blade is more preferably in a range of 4 to 12 m/sec and still more preferably in a range of 4 to 8 m/sec.

The rotation speed of the stirring blade can be set to be in a range of 30 to 1800 rpm. The rotation speed of the chopper can be set to be in a range of 800 to 5000 rpm. The ratio A'/A is likely to decrease as the rotation speed of the stirring blade and the chopper increases within a range where the fibers are not cut.

EXAMPLES

Hereinafter, the present invention will be described in more detail with reference to examples. The present invention is not limited to the following examples within a range not departing from the gist of the present invention.

[Stirring Granulator]

In Examples 1 to 4, the stirring granulator is formed such that three stirring blades radially extend from the rotating shaft at the center as shown in FIG. 1. The tilt angles θ of the stirring blades are respectively as follows.

[Measurement and Evaluation Method]

Various measurement and evaluation methods are as follows.

<Surface Tension>

The surface tension of the fiber treatment agent at 23° C. was measured with an automatic surface tensiometer (CBVP-A3, Kyowa Interface Science Co., Ltd., plate method).

<Viscosity>

The viscosity of the fiber treatment agent at 23° C. was measured with a B type rotational viscometer (Brookfield: LVDV-1 Pri, Spindle S61). The value measured at 50 rpm was defined as a representative value of the viscosity.

<Average Fiber Length>

One fiber assembly was immersed in ethanol to be loosened to a single fiber, the fibers were transferred onto filter paper, dried, and imaged with a digital microscope (HX-6000-2, Keyence Corporation), and the fiber length was measured by built-in software. The fiber lengths of 100 fibers were measured for each sample, and the average fiber length (weighted average fiber length) of the measured values was calculated. The weighted average fiber length was determined by dividing the sum of the squares of the measured lengths by the sum of the measured lengths to weight the lengths (weighted average fiber length $L=\Sigma 1^2/\Sigma 1$).

<Bulk Density>

100 mL of a plurality of fiber assemblies were added to a container having a diameter of φ50 mm, the container was tapped 10 times from a height of 3 cm so that the fiber assemblies were deposited, and the bulk density was calculated based on the volume and the weight thereof. The measurement was performed in conformity with JIS Z 2512 and JIS R 1628.

<Major Axis Ratio A'/A>

The fiber bundles obtained as the fiber assemblies were disposed on a white plate horizontally maintained and imaged at a magnification of 20 times in the vertical direction opposite to the direction of the white plate using a digital microscope VHX-6000 and a ring lighting. The captured image of the fiber bundles in Example 1 is shown in FIG. 9. The captured image of the fiber bundles in Comparative Example 1 is shown in FIG. 12. A binary image was obtained by performing Otsu's binarization processing (Make Binary) on the captured image using ImageJ (Wayne Rasband). The contours of the binary image were extracted (Analyze Particles, Outlines) to obtain the contour of one fiber bundle. The contour of the fiber bundle in Example 1 is shown in FIG. 10. The Feret's diameter (Feret's Diameter) was determined from the obtained contour and defined as the length A of the major axis. The length A' of the major axis (Major) of the ellipse obtained by ellipse approximation to the contour (Analyze Particles, Ellipses) using the least squares method was obtained. The major axis ratio A'/A was determined by dividing the length A' by the length A. The approximated ellipse in Example 1 is shown in FIG. 11.

<B and C>

The fiber bundles obtained as the fiber assemblies were disposed on a white plate horizontally maintained, and the length thereof in a direction orthogonal to the major axis was measured with a vernier caliper and defined as B. The fiber bundles were disposed on a white plate horizontally maintained, and the height thereof in the vertical direction orthogonal to the major axis was measured with a height gauge and defined as C.

<Area Ratio S'/S>

The fiber bundles obtained as the fiber assemblies were disposed on a white plate horizontally maintained and imaged at a magnification of 20 times in the vertical direction opposite to the direction of the white plate using a digital microscope VHX-6000 and a ring lighting. The captured image of the fiber bundles in Example 1 is shown in FIG. 9. The captured image of the fiber bundles in Comparative Example 1 is shown in FIG. 12. A binary image was obtained by performing Otsu's binarization processing (Make Binary) on the captured image using ImageJ (Wayne Rasband). The contours of the binary image were extracted (Analyze Particles, Outlines) to obtain the contour of one fiber bundle. The contour of the fiber bundle in Example 1 is shown in FIG. 10. The Feret's diameter (Feret's Diameter) was determined from the obtained contour and defined as the length A of the major axis. When the point bisecting the major axis was defined as F, the intersection points between the perpendicular line with respect to the major axis in F and the contour were defined as Y and Y', and the straight line connecting Y and Y' was defined as a minor axis B, the area determined by the expression ($S=\pi \times A/2 \times B/2$) was defined as S. The area (Area) of the ellipse obtained by ellipse approximation to the contour (Analyze Particles, Ellipses were selected) using the least squares method was defined as S'. The area ratio S'/S was determined by dividing the area S' by the area S.

<Repose Angle>

200 g of the fiber bundles were naturally dropped from a position at a height of 100 mm onto a horizontally maintained circular plate having a diameter of φ95 mm, and the accumulated height of the fiber bundles was measured 10 seconds after the dropping. When the radius of the circular plate was defined as R and the lamination height was defined as T, the repose angle was determined by the equation of "θ=tan⁻¹ (T/R)".

<Number Proportion of Fiber Bundles W (0.75-0.95 Number Proportion)>

The number proportion was determined by randomly extracting 111 fiber bundles from a plurality of fiber bundles and dividing the number of fiber bundles in which the ratio A'/A was in a range of 0.75 to 0.93 by 111. The ratio A'/A was determined in the same manner as in <major axis ratio A'/A> except that the digital microscope was replaced with a digital camera.

<Weight Distribution of Carbon Fiber Assembly>

300 fiber bundles were randomly extracted from a plurality of fiber bundles, and the weights of the respective fiber bundles were measured. The number average and the weight average were calculated from the measured results of the 300 fiber bundles. The weight distribution of the carbon fiber assembly was determined by dividing the weight average by the number average.

Production Example 1: Dispersion Liquid 1

A component (A), a component (B), and a component (C) of the following kinds in the following blending amounts were kneaded and mixed with a planetary mixer and a homomixer at 80° C. to 100° C. Thereafter, the mixture was cooled to 80° C. in a state where the kneading was maintained, and an aqueous solution of the following component (D) was added to the mixture little by little. In this step, the viscosity of the contents was gradually increased. After the aqueous solution of the component (D) was entirely put into the mixture, the mixture was cooled to 60° C. for 10 minutes while being sufficiently kneaded. Next, deionized water was added dropwise to the mixture little by little and allowed to pass through a phase inversion point, and the amount of water to be added dropwise was increased. Finally, an aqueous dispersion liquid 1 containing about 40% by mass of active components was obtained.

(A) One terminal acryl-modified bisphenol A epoxy resin (35 parts by mass) (EP828 base, manufactured by Mitsubishi Chemical Corporation)
(B) Aliphatic urethane acrylate oligomer (30 parts by mass) (CN-9788, manufactured by Sartomer)
(C) Ethylene oxide 2-mol adduct fumaric anhydride ester of bisphenol A (20 parts by mass)
(D) NEWCOL 723SF (15 parts by mass) (manufactured by Nippon Nyukazai Co., Ltd.)

Example 1

Fluffy recycled carbon fibers (average fiber length: 2.5 mm, bulk density: 0.034 g/cm³) obtained by a thermal decomposition method were used as the carbon fibers. First, 1200 g of carbon fibers were put into a stirring granulator (trade name: SP Granulator SPG25T, manufactured by Dalton Corporation, device volume: 25 L, tilt angle θ of stirring blade: 30°, diameter of stirring blade: 396 mm) and stirred for 1 minute to be loosened. Next, a liquid (surface tension at 23° C.: 39.5 mN/m, viscosity at 23° C.: 0.0017 Pa·s) obtained by mixing 900 g of water and 60 g of the dispersion liquid 1 (solid content concentration: 40% by mass) as a fiber treatment agent was put into the stirring granulator and stirred with a stirring blade at 400 rpm (peripheral speed of stirring blade: 8 m/sec) and a chopper at 3000 rpm for 6 minutes so that the fibers were granulated. The granules were dried by a box type dryer at 120° C. for 2 hours, thereby obtaining a carbon fiber assembly in a prolate spheroidal shape having a short diameter of 1.5 mm and a major axis of 12 mm.

The peripheral speed of the stirring blade was 8.3 m/s, the charging height of the raw materials was 0.28 m, and the strain rate was 30 [l/s]. Further, the strain amount was 10600.

With the obtained carbon fiber assembly, the average fiber length, the bulk density, and the like of the carbon fibers in the carbon fiber assembly were measured by the methods described above, and the results are listed in Table 1.

Further, the appearance of the carbon fiber assembly was observed, the state where the carbon fibers were aligned was investigated, and the results are listed in Table 1.

The major axis ratio (A'/A) of the fiber assembly was 0.91, the area ratio (S'/S) was 0.92, the particle density was 0.71 g/cm³, and the repose angle was 54°.

When the fiber assembly was put into a screw feeder (manufactured by Labtech Engineering Co., Ltd., single axis, feeder diameter φ: 33, screw diameter φ: 25) having a hopper (inverted quadrangular pyramid shape, inlet length: 120 mm, inlet width: 200 mm, outlet length: 120 mm, outlet width: 35 mm, hopper angle: 35°) and operated at 10 rpm, the discharge amount measured four times every 36 seconds was an average of 1.74 g, and the standard deviation was 0.09 g. The number proportion of the fiber bundles in which the ratio A'/A was in a range of 0.75 to 0.93 was 58%.

The fiber assembly of Example 1 was more stably discharged as compared with the fiber assembly of Comparative Example 1 described below.

Example 2

A carbon fiber assembly having a prolate spheroidal shape with a short diameter of 1.5 mm and a major axis of 12 mm was obtained in the same manner as in Example 1 except that the recycled carbon fibers were replaced with virgin carbon fibers (trade name: Pyrofil Chopped Fibers TR03CM, manufactured by Mitsubishi Chemical Corporation, cut length: 3.1 mm, bulk density of 0.706 g/cm³) and the amount of water of the fiber treatment agent used was changed to 180 g in the method for producing the carbon fiber assembly of Example 1 described above.

The surface tension at 23° C. of the fiber treatment agent (mixture of water and dispersion liquid 1) used in the present example was 38.4 mN/m, and the viscosity at 23° C. was 0.0029 Pa·s.

The peripheral speed of the stirring blade was 8.3 m/s, the charging height of the raw materials was 0.014 m, and the strain rate was 613 [l/s]. Further, the strain amount was 220700.

The results of evaluating the obtained carbon fiber assembly in the same manner as in Example 1 are listed in Table 1.

The major axis ratio (A'/A) of the fiber assembly was 0.80, the area ratio (S'/S) was 0.78, the particle density was 0.83 g/cm³, and the repose angle was 50°.

When the fiber assembly was put into a screw feeder (manufactured by Labtech Engineering Co., Ltd., single axis, feeder diameter p: 33, screw diameter p: 25) having a hopper (inverted quadrangular pyramid shape, inlet length: 120 mm, inlet width: 200 mm, outlet length: 120 mm, outlet width: 35 mm, hopper angle: 35°) and operated at 10 rpm, the discharge amount measured four times every 36 seconds was an average of 2.28 g, and the standard deviation was 2.48 g.

The fiber assembly of Example 2 was discharged in a larger amount as compared with the fiber assembly of Comparative Example 1 described below.

Example 3

A carbon fiber assembly having an ellipsoidal shape was obtained in the same manner as in Example 1 except that the recycled carbon fibers were replaced with 3000 g of virgin carbon fibers (trade name: Pyrofil Chopped Fibers TR03CM, manufactured by Mitsubishi Chemical Corporation, cut length 3.1 mm, bulk density 0.706 $g/cm^3$), the dispersion liquid 1 was replaced with 250 g of the dispersion liquid 2 (anionic polyamide solution, solid content concentration 40% by mass), and the amount of water used was changed to 200 g in the method for producing the carbon fiber assembly of Example 1 described above. The surface tension at 23° C. of the fiber treatment agent (mixture of water and dispersion liquid 2) was 59.0 mN/m, and the viscosity at 23° C. was 0.0022 Pa·s.

The results of evaluating the obtained carbon fiber assembly in the same manner as in Example 1 are listed in Table 1. The obtained carbon fiber assembly was more rigid than the carbon fiber assembly of Example 1 and tended to keep its shape.

Example 4

The granulator was replaced with a stirring granulator (trade name: Henschel Mixer FM10B, manufactured by Mitsui Miike Machinery Co., Ltd., device volume: 9 L, tilt angle θ of stirring blade: 30°). 200 g of recycled carbon fibers (average fiber length: 2.5 mm, bulk density: 0.03 $g/cm^3$) and a liquid obtained by mixing 140 g of water and 20 g of the dispersion liquid 1 (polyester emulsion, solid content concentration: 40% by mass) as a fiber treatment agent were put into the stirring granulator and stirred with a stirring blade at 1200 rpm (peripheral speed of stirring blade: 13 m/sec) for 3 minutes so that the fibers were granulated. The granules were dried by a box type dryer at 120° C. for 2 hours, thereby obtaining a carbon fiber assembly having an ellipsoidal shape.

The results of evaluating the obtained carbon fiber assembly in the same manner as in Example 1 are listed in Table 1.

Example 5

The granulator was replaced with a stirring granulator (trade name: Henschel Mixer FM10B, manufactured by Mitsui Miike Machinery Co., Ltd., device volume: 9 L, tilt angle θ of stirring blade: 30°). 200 g of virgin carbon fibers (trade name: Pyrofil Chopped Fibers TR03CM, manufactured by Mitsubishi Chemical Corporation, cut length: 3.1 mm, bulk density of 0.706 $g/cm^3$) and 40 g of water as a fiber treatment agent were put into the stirring granulator and stirred with a stirring blade at 1200 rpm (peripheral speed of stirring blade: 13 m/sec) for 3 minutes so that the fibers were granulated. The granules were dried by a box type dryer at 120° C. for 2 hours, thereby obtaining a carbon fiber assembly having an ellipsoidal shape.

The results of evaluating the obtained carbon fiber assembly in the same manner as in Example 1 are listed in Table 1.

Example 6

The granulator was replaced with a tumbling-agitating granulator (trade name: Intensive Mixer R05T, manufactured by Eirich Corporation, device volume: 40 L, rotor type: star type). 6000 g of virgin carbon fibers (trade name: Pyrofil Chopped Fibers TR03CM, manufactured by Mitsubishi Chemical Corporation, cut length: 3.1 mm, bulk density of 0.706 $g/cm^3$) and a liquid obtained by mixing 200 g of water and 700 g of the dispersion liquid 2 (anionic polyamide solution, solid content concentration 40% by mass) as a fiber treatment agent were put into the granulator and stirred with a speed of 29 rpm in the mixing pan (peripheral speed of rotating container: 0.8 m/sec) and 560 rpm in the stirring rotor (peripheral speed of stirring blade: 8 m/sec) for 3 minutes so that the fibers were granulated. The direction of rotation of the stirring rotor was opposite to the mixing pan. The granules were dried by a box type dryer at 120° C. for 2 hours, thereby obtaining a carbon fiber assembly having an ellipsoidal shape.

The results of evaluating the obtained carbon fiber assembly in the same manner as in Example 1 are listed in Table 1. The obtained carbon fiber assembly was harder than the carbon fiber assembly of Example 1 and tended to keep its shape.

Example 7

The granulator was replaced with a tumbling-agitating granulator (trade name: Intensive Mixer R05T, manufactured by Eirich Corporation, device volume: 40 L, rotor type: star type). 6000 g of recycled carbon fibers (average fiber length: 6.0 mm, bulk density: 0.15 $g/cm^3$) and a liquid obtained by mixing 350 g of water and 700 g of the dispersion liquid 2 (anionic polyamide solution, solid content concentration 40% by mass) as a fiber treatment agent were put into the granulator and stirred for 6 minutes to granulate. The rotation speed of the mixing pan was 29 rpm (peripheral speed of rotating container: 0.8 m/sec). The rotation speed of the stirring rotor was 1120 rpm (peripheral speed of stirring blade: 16 m/sec) for the first 3 minutes and 140 rpm (peripheral speed of stirring blade: 2 m/sec) for the next 3 minutes. The direction of rotation of the stirring rotor was opposite to that of the mixing pan. The granules were dried by a box type dryer at 120° C. for 2 hours, thereby obtaining a carbon fiber assembly having an ellipsoidal shape.

The results of evaluating the obtained carbon fiber assembly in the same manner as in Example 1 are listed in Table 1. The obtained carbon fiber assembly was harder than the carbon fiber assembly of Example 1 and tended to keep its shape.

Example 8

The carbon fiber assembly obtained in Example 7 above was put into a vibrating sieve (trade name: vibrating sieve 401C, manufactured by Dalton Corporation, sieve mesh: 5 mesh, linear 0.8 mm, mesh opening 4.3 mm), and vibrated at an amplitude of 35 Hz, and the classified matter that passed through the sieve was collected to obtain a carbon fiber assembly having an ellipsoidal shape.

The results of evaluating the obtained carbon fiber assembly in the same manner as in Example 1 are listed in Table 1. In feed evaluation, the fiber assembly of Example 8 was able to discharge a larger amount than the fiber assembly of Example 7.

Experimental Example 1

The granulator was replaced with a tumbling granulator (pan type, internal dimensions of rotating container φ240× 75 mm). 50a of virgin carbon fibers (trade name: Pyrofil Chopped Fibers TR03CM, manufactured by Mitsubishi Chemical Corporation, cut length: 3.1 mm, bulk density of 0.706 g/cm$^3$) and log of water as a fiber treatment agent was put into the granulator and rolled for 6 minutes at an inclination angle of 45° and a rotation speed of 60 rpm (peripheral speed of side wall surface 0.75 m/s) to granulate. The granules were dried by a box type dryer at 120° C. for 2 hours, thereby obtaining a carbon fiber assembly having an ellipsoidal shape.

The results of evaluating the obtained carbon fiber assembly in the same manner as in Example 1 are listed in Table 1.

Experimental Example 2

The granulator was replaced with a vibrating granulator (cylindrical sealed container, internal dimensions of container φ80×200 mm). 50 g of virgin carbon fibers (trade name: Pyrofil Chopped Fibers TR03CM, manufactured by Mitsubishi Chemical Corporation, cut length: 3.1 mm, bulk density of 0.706 g/cm$^3$) and log of water as a fiber treatment agent were put into the granulator and granulated by manual vibration (frequency 2 Hz, amplitude 200 mm) for 30 seconds. The granules were dried by a box type dryer at 120° C. for 2 hours, thereby obtaining a carbon fiber assembly having an ellipsoidal shape.

The results of evaluating the obtained carbon fiber assembly in the same manner as in Example 1 are listed in Table 1.

Experimental Example 3

The granulator was replaced with an extrusion granulator (trade name: Pelleter Double EXDF (frontal-extrusion type), manufactured by Dalton Corporation, screen diameter 6 mm). 100 g of virgin carbon fibers (trade name: Pyrofil Chopped Fibers TR03CM, manufactured by Mitsubishi Chemical Corporation, cut length: 3.1 mm, bulk density of 0.706 g/cm$^3$), and 1000 g of water as a fiber treatment agent, and 10 g of polyacrylamide (trade name: Acryprimer GA1055L, manufactured by Mitsubishi Chemical Corporation) were mixed and extruded at 200 kg/h to granulate. The granules were dried by a box type dryer at 120° C. for 2 hours, thereby obtaining a amorphous carbon fiber assembly. The shape of the amorphous carbon fiber assembly is shown in FIG. 12.

The results of evaluating the obtained carbon fiber assembly in the same manner as in Example 1 are listed in Table 1.

Experimental Example 4

The granulator was replaced with a tumbling granulator (pan type, internal dimensions of rotating container φ240× 75 mm). 50a of recycled carbon fibers (average fiber length: 2.5 mm, bulk density: 0.03 g/cm$^3$) and a liquid obtained by mixing 37.5 g of water and 2.5 g of the dispersion liquid 1 (polyester emulsion, solid content concentration: 40% by mass) as a fiber treatment agent were put into the granulator and rolled for 6 minutes at an inclination angle of 45° and a rotation speed of 60 rpm (peripheral speed of side wall surface 0.75 m/s) to granulate. The granules were dried by a box type dryer at 120° C. for 2 hours, thereby obtaining a amorphous carbon fiber assembly. The shape of the amorphous carbon fiber assembly is shown in FIG. 13.

The results of evaluating the obtained carbon fiber assembly in the same manner as in Example 1 are listed in Table 1.

Experimental Example 5

The granulator was replaced with a vibrating granulator (cylindrical closed container, internal dimensions of container φ80×200 mm). 50 g of recycled carbon fibers (average fiber length: 2.5 mm, bulk density: 0.03 g/cm$^3$) and a liquid obtained by mixing 37.5 g of water and 2.5 g of the dispersion liquid 1 (polyester emulsion, solid content concentration: 40% by mass) as a fiber treatment agent were put into the granulator and granulated by manual vibration (frequency 2 Hz, amplitude 200 mm) for 30 seconds. The granules were dried by a box type dryer at 120° C. for 2 hours, thereby obtaining a amorphous carbon fiber assembly.

The results of evaluating the obtained carbon fiber assembly in the same manner as in Example 1 are listed in Table 1.

TABLE 1

| | | | | | Fiber treatment agent | |
| | | | | | | |
| | | | Added carbon fibers | | | Resin charging amount (amount |
| | Granulator | | | Fiber length | | with respect to 100 parts by |
| | Method | Device | Type | (mm) | Type | mass of fibers) |
|---|---|---|---|---|---|---|
| Example 1 | Stirring granulation | SP Granulator | Recycled | 2.5 | Dispersion liquid 1 | 2 |
| Example 2 | Stirring granulation | SP Granulator | Virgin | 3.1 | Dispersion liquid 1 | 2 |
| Example 3 | Stirring granulation | SP Granulator | Virgin | 3.1 | Dispersion liquid 2 | 3.5 |
| Example 4 | Stirring granulation | Henschel mixer | Recycled | 2.5 | Dispersion liquid 1 | 4 |

TABLE 1-continued

| Example | Process | Device | Type | Value | Fiber treatment agent | Amount |
|---|---|---|---|---|---|---|
| Example 5 | Stirring granulation | Henschel mixer | Virgin | 3.1 | Only water | 0 |
| Example 6 | Rolling stirring granulation | Intensive mixer | Virgin | 3.1 | Dispersion liquid 2 | 3.5 |
| Example 7 | Rolling stirring granulation | Intensive mixer | Recycled | 6.0 | Dispersion liquid 2 | 3.5 |
| Example 8 | Rolling stirring granulation | Intensive mixer | Recycled | 6.0 | Dispersion liquid 2 | 3.5 |
| Experimental Example 1 | Rolling granulation | Pan type granulator φ240 | Virgin | 3.1 | Only water | 0 |
| Experimental Example 2 | Vibration granulation | Cylindrical container H200 | Virgin | 3.1 | Only water | 0 |
| Experimental Example 3 | Extrusion granulation | Pelleter double | Virgin | 3.1 | Thickener | 10 |
| Experimental Example 4 | Rolling granulation | Pan type granulator φ240 | Recycled | 2.5 | Dispersion liquid 1 | 2 |
| Experimental Example 5 | Vibration granulation | Cylindrical container H200 | Recycled | 2.5 | Dispersion liquid 1 | 2 |

| | | | Carbon fiber assembly | | | | |
|---|---|---|---|---|---|---|---|
| | Bulk density ($cm^3$) | Shape | Major axis length (mm) | Major axis ratio (A'/A) | 0.75-0.93 number proportion (%) | Feed evaluation Discharge amount (g) | Standard deviation (g) |
| Example 1 | 0.278 | Ellipsoid | 12 | 0.91 | 58 | 1.74 | 0.09 |
| Example 2 | 0.481 | Ellipsoid | 12 | 0.80 | 80 | 2.28 | 2.48 |
| Example 3 | 0.351 | Ellipsoid | 9 | 0.94 | 38 | 5.30 | 4.39 |
| Example 4 | 0.176 | Ellipsoid | 9 | | | | |
| Example 5 | 0.393 | Ellipsoid | 16 | | | | |
| Example 6 | 0.372 | Ellipsoid | 11 | 0.94 | 42 | 5.94 | 2.84 |
| Example 7 | 0.361 | Ellipsoid | 10 | 0.87 | 50 | 5.21 | 2.76 |
| Example 8 | 0.425 | Ellipsoid | 9 | 0.95 | 31 | 7.35 | 2.88 |
| Experimental Example 1 | 0.314 | Ellipsoid | 20 | | | | |
| Experimental Example 2 | 0.471 | Ellipsoid | 25 | | | | |
| Experimental Example 3 | 0.025 | Amorphous | Impossible to measure | Impossible to measure | Impossible to measure | 0.25 | 0.25 |
| Experimental Example 4 | 0.067 | Amorphous | Impossible to measure | Impossible to measure | Impossible to measure | 0.63 | 0.39 |
| Experimental Example 5 | 0.100 | Amorphous | Impossible to measure | Impossible to measure | Impossible to measure | 1.41 | 0.96 |

With the methods of Experimental Examples 3 to 5, an ellipsoidal carbon fiber assembly could not be obtained within a specific period of time. In the methods of Experimental Examples 3 to 5, for example, an ellipsoidal carbon fiber assembly may be obtained by lengthening the treatment time. However, the methods of Examples 1 to 8 were superior to the methods of Experimental Examples 3 to 5 in that ellipsoidal carbon fiber assembly were obtained efficiently in a short time.

Example 9

Virgin carbon fibers (cut product of TR50S15L manufactured by Mitsubishi Chemical Corporation, fiber length 25 mm) were used as the carbon fibers. First, 1000 g of carbon fibers were put into a stirring granulator (trade name: SP Granulator SPG25T, manufactured by Dalton Corporation, device volume: 25 L, tilt angle θ of stirring blade: 30°) and stirred for 1 minute to be loosened. Next, 400 g of water as a fiber treatment agent was put into the stirring granulator and stirred for 7 minutes so that the fibers were granulated. The peripheral speed of the tip of the stirring blade was 4 m/s for the first 1 minute, 8 m/s for the next 3 minutes, and 4 m/s for the next 3 minutes. The granules were dried in a vibrating hot air dryer at 110° C. for 30 minutes to obtain a strand-like carbon fiber assembly.

The results of evaluating the obtained carbon fiber assembly are listed in Table 2.

Example 10

A strand-like carbon fiber assembly was obtained in the same manner as in Example 9 above except that the fiber treatment agent was replaced with a mixed liquid of 375 g of water and 25 g of dispersion liquid 1 (polyester emulsion, solid content concentration 40% by mass).

The results of evaluating the obtained carbon fiber assembly are listed in Table 2.

Example 11

A strand-like carbon fiber assembly was obtained in the same manner as in Example 9 above except that the virgin carbon fibers were replaced with 1000 g of recycled carbon fibers (fluffy carbon fibers obtained by pyrolyzing SMC made of short carbon fiber TR50S15L manufactured by Mitsubishi Chemical Corporation and vinyl ester resin, fiber length 25 mm) and that the fiber treatment agent was changed to 50 g of liquid obtained by mixing 750 g of water and 50 g of dispersion 1 (polyester emulsion, solid content concentration 40% by mass).

The results of evaluating the obtained carbon fiber assembly are listed in Table 2.

Example 12

The granulator was replaced with a tumbling-agitating granulator (trade name: Intensive Mixer R05T, manufactured by Eirich Corporation, device volume: 40 L, rotor type: star type). 3000 g of recycled carbon fibers (fluffy carbon fibers obtained by pyrolyzing SMC made of short carbon fiber TR50S15L manufactured by Mitsubishi Chemical Corporation and vinyl ester resin, fiber length 25 mm) and a liquid obtained by mixing 1950 g of water and 450 g of dispersion 1 (polyester emulsion, solid content concentration 40% by mass) as a fiber treatment agent were put into the granulator and stirred for 9 minutes to granulate. The rotation speed of the mixing pan was 29 rpm (peripheral speed of rotating container: 0.8 m/sec). The rotational speed of the stirring rotor was 1120 rpm (peripheral speed of stirring blade: 16 m/sec) for the first 6 minutes and 140 rpm (peripheral speed of stirring blade: 2 m/sec) for the next 3 minutes. The direction of rotation of the stirring rotor was the opposite direction to the mixing pan for the first 6 minutes, and the same direction as the mixing pan for the next 3 minutes. The granules were dried by a box-type dryer at 120° C. for 2 hours to obtain a strand-like carbon fiber assembly.

The results of evaluating the obtained carbon fiber assembly are listed in Table 2.

Modification of Example 12

A carbon fiber assembly was obtained in the same manner as in Example 12, except that the stirring rotor was rotated in the opposite direction to the mixing pan for the first 3 minutes and in the same direction as the mixing pan for the next 6 minutes. The obtained carbon fiber assembly had a higher bulk density and a larger weight distribution value than the carbon fiber assembly of Example 12.

Experimental Example 6

The granulator was replaced with a tumbling granulator (pan type, internal dimensions of rotating container φ240×75 mm). 50 g of recycled carbon fibers (fluffy carbon fibers obtained by pyrolyzing SMC made of short carbon fiber TR50S15L manufactured by Mitsubishi Chemical Corporation and vinyl ester resin, fiber length 25 mm) and a liquid obtained by mixing 37.5 g of water and 2.5 g of dispersion 1 (polyester emulsion, solid content concentration 40% by mass) as a fiber treatment agent were put into the granulator and rolled for 6 minutes at an inclination angle of 45° and a rotation speed of 60 rpm (peripheral speed of side wall surface 0.75 m/s) to granulate. The granules were dried by a box type dryer at 120° C. for 2 hours, thereby obtaining a amorphous carbon fiber assembly.

The results of evaluating the obtained carbon fiber assembly are listed in Table 2.

Experimental Example 7

The granulator was replaced with a vibrating granulator (cylindrical sealed container, inner dimensions of container φ80×200 mm). 50 g of recycled carbon fibers (fluffy carbon fibers obtained by pyrolyzing SMC made of short carbon fiber TR50S15L manufactured by Mitsubishi Chemical Corporation and vinyl ester resin, fiber length 25 mm) and a liquid obtained by mixing 37.5 g of water and 2.5 g of dispersion 1 (polyester emulsion, solid content concentration 40% by mass) as a fiber treatment agent were put into the granulator and granulated by manual vibration (frequency 2 Hz, amplitude 200 mm) for 30 seconds. The granules were dried by a box type dryer at 120° C. for 2 hours, thereby obtaining a amorphous carbon fiber assembly.

The results of evaluating the obtained carbon fiber assembly are listed in Table 2.

TABLE 2

| | Granulator | | Added carbon fibers | | Fiber treatment agent | |
| | | | | | | |
| | | | | Fiber length | | Resin charging amount (amount with respect to 100 parts by |
| | Method | Device | Type | (mm) | Type | mass of fibers) |
|---|---|---|---|---|---|---|
| Example 9 | Stirring granulation | SP Granulator | Virgin | 25 | Only water | 0 |
| Example 10 | Stirring granulation | SP Granulator | Virgin | 25 | Dispersion liquid 1 | 1 |
| Example 11 | Stirring granulation | SP Granulator | Recycled | 25 | Dispersion liquid 1 | 2 |
| Example 12 | Rolling stirring granulation | Intensive mixer | Recycled | 25 | Dispersion liquid 1 | 6 |
| Experimental Example 6 | Rolling granulation | Pan type granulator φ240 | Recycled | 25 | Dispersion liquid 1 | 2 |
| Experimental Example 7 | Vibration granulation | Cylindrical container H200 | Recycled | 25 | Dispersion liquid 1 | 2 |

TABLE 2-continued

| | Carbon fiber assembly | | | Evaluation of weight distribution of carbon fiber assembly | | |
|---|---|---|---|---|---|---|
| | Bulk density (cm³) | Shape | Bundle length (mm) | Number average (mg) | Weight average (mg) | Distribution |
| Example 9 | 0.137 | Strand | 45 | 18.5 | 22.2 | 1.2 |
| Example 10 | 0.083 | Strand | 38 | 6.8 | 10.9 | 1.6 |
| Example 11 | 0.030 | Strand | 33 | 4.8 | 7.8 | 1.6 |
| Example 12 | 0.096 | Strand | 33 | 6.7 | 12.4 | 1.8 |
| Experimental Example 6 | 0.047 | Amorphous | Impossible to measure | Impossible to measure | Impossible to measure | Impossible to measure |
| Experimental Example 7 | 0.062 | Amorphous | Impossible to measure | Impossible to measure | Impossible to measure | Impossible to measure |

From the above results, it can be seen that, according to the Examples, it is possible to produce a carbon fiber assembly having a high bulk density in which the fibers are aligned while maintaining the length without cutting the fibers. The obtained fiber assembly has the following effects.

The fibers that make up the fiber assembly are oriented in one direction, making it difficult to form bridges in the feeder.

The fibers are less likely to be cut during the granulation process, and the fiber length of the fibers in the fiber assembly does not become excessively short relative to the fiber length of the fibers used. Therefore, the inherent effects of the fibers used for manufacturing the fiber assembly can be effectively exhibited.

Since the bulk density of the fiber assembly is high, the handling workability and compounding efficiency of the fiber assembly are good.

Although the present invention has been described in detail by way of the specific modes, it is apparent for those skilled in the art that various changes can be made without departing from the spirit and scope of the present invention.

The present application is based on Japanese Patent Application No. 2021-101844, Japanese Patent Application No. 2021-101845 and Japanese Patent Application No. 2021-101846 filed on Jun. 18, 2021, Japanese Patent Application No. 2021-174789 filed on Oct. 26, 2021, and Japanese Patent Application No. 2021-189657 filed on Nov. 22, 2021, the entire contents of which are incorporated herein by reference.

REFERENCE SIGNS LIST

1 Stirring Tank
2 Rotating Shaft
3 Stirring Blade
11 Granulation Pan
12 Rolling Shaft
21 Arm
22 Sprayer
23 Scraper
40 Container
44 Stirring Blade
45 Scraper

The invention claimed is:

1. A method of producing a fiber assembly, comprising:
heat treating a plurality of fibers in a cotton form in an oxidizing atmosphere to remove resin residue included in the plurality of fibers,
putting the plurality of fibers and a fiber treatment agent into a stirring tank; and stirring a mixture of the plurality of fibers and the fiber treatment agent with a stirring blade to granulate the mixture so that the plurality of fibers are aligned;
wherein the plurality of fibers includes carbon fibers,
the plurality of fibers has an average fiber length of 2 to 12 mm, and
the fiber assembly has a bulk density of 0.3 g/cm³ or more.

2. The method of producing a fiber assembly according to claim 1, wherein the fiber assembly is composed of a fiber bundle, and the plurality of fibers presents on the surface of the fiber bundle are curved and oriented along an outline of an ellipsoid.

3. The method of producing a fiber assembly according to claim 1,
wherein the stirring tank includes a scraper and is made to rotate.

4. The method of producing a fiber assembly according to claim 3,
wherein the stirring is carried out such that a rotation direction of the stirring blade is the same as a rotation direction of the stirring tank after the stirring is carried out such that the rotation direction of the stirring blade is opposite to the rotation direction of the stirring tank.

5. The method of producing a fiber assembly according to claim 3, further comprising:
rotating the stirring tank at a peripheral speed of 1.2 m/sec or less.

6. The method of producing a fiber assembly according to claim 1,
wherein the fiber treatment agent has a surface tension of 120 mN/m or less at 23° C.

7. The method of producing a fiber assembly according to claim 1,
wherein the fiber treatment agent has a viscosity of 10 Pa's or less at 23° C.

8. The method of producing a fiber assembly according to claim 1,
wherein positions of tips of the plurality of fibers constituting the fiber assembly are not aligned.

9. The method of producing a fiber assembly according to claim 1,
wherein a length of a major axis of the fiber assembly is greater than an average fiber length of the plurality of fibers contained in the fiber assembly.

10. The method of producing a fiber assembly according to claim 1,
wherein the fiber assembly has a prolate spheroidal shape or a strand shape.

11. The method of producing a fiber assembly according to claim 1, wherein a ratio (Y/X) of an average fiber length Y of the plurality of fibers in the fiber assembly to an average fiber length X of the plurality of fibers before being put into the stirring tank is 0.55 or greater.

12. A method of producing a prepreg sheet, comprising:

accumulating a plurality of fiber assemblies obtained by the method of producing a fiber assembly according to claim 1.

13. The method according to claim 1, wherein the fiber assembly consists of a plurality of carbon fibers and an organic binder;

wherein the carbon fibers are recycled fibers, the fibers have an average fiber length of 2 to 12 mm, the carbon fiber assembly has a bulk density of 0.3 g/cm$^3$ or more, and the carbon fiber assembly has a prolate spherical shape with a major axis length of 3 mm to 18 mm.

14. The method according to claim 13, wherein the fiber assembly is composed of a fiber bundle, and the fibers present on the surface of the fiber bundle are curved and oriented along an outline of an ellipsoid.

\* \* \* \* \*